US011445360B2

(12) United States Patent
Zhang et al.

(10) Patent No.: US 11,445,360 B2
(45) Date of Patent: Sep. 13, 2022

(54) MISUSED AERIAL USAGE IDENTIFICATION

(71) Applicant: Lenovo (Beijing) Limited, Beijing (CN)

(72) Inventors: Zhuoyun Zhang, Beijing (CN); Jing Han, Beijing (CN); Haiming Wang, Beijing (CN); Lianhai Wu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 291 days.

(21) Appl. No.: 16/755,095

(22) PCT Filed: Oct. 19, 2017

(86) PCT No.: PCT/CN2017/106840
§ 371 (c)(1),
(2) Date: Apr. 9, 2020

(87) PCT Pub. No.: WO2019/029004
PCT Pub. Date: Feb. 14, 2019

(65) Prior Publication Data
US 2021/0407301 A1 Dec. 30, 2021

(30) Foreign Application Priority Data

Aug. 11, 2017 (WO) ................ PCT/CN2017/097263

(51) Int. Cl.
*G08G 5/00* (2006.01)
*H04W 8/20* (2009.01)
(Continued)

(52) U.S. Cl.
CPC .............. *H04W 8/20* (2013.01); *G08G 5/006* (2013.01); *G08G 5/0013* (2013.01);
(Continued)

(58) Field of Classification Search
CPC .............. G08G 5/0013; G08G 5/0069; H04B 7/18506; H04W 4/025; H04W 4/44
See application file for complete search history.

(56) References Cited

U.S. PATENT DOCUMENTS 9,734,723 B1 * 8/2017 Bruno .................. G08G 5/0056
2016/0225264 A1 8/2016 Taveira
(Continued)

FOREIGN PATENT DOCUMENTS

CN 105225540 A 1/2016
CN 106940535 A 7/2017
(Continued)

OTHER PUBLICATIONS

PCT/CN2017/106840 "International Search Report and the Written Opinion of the International Searching Authority", ISN/CN State Intellectual Property Office of the P.R. China, dated Apr. 2, 2018, pp. 1-7.
(Continued)

Primary Examiner — Andrew W Bee
(74) Attorney, Agent, or Firm — Kunzler Bean & Adamson

(57) ABSTRACT

Method, base unit and control node for misused aerial usage identification are disclosed. A method comprises: receiving location information of a mobile unit; judging whether the mobile unit is a registered aerial vehicle or an unregistered aerial vehicle; determining whether the mobile unit is in the (Continued)

state of flying based on the location information of the mobile unit; and identifying the mobile unit as a misused aerial vehicle in the condition that the mobile unit is determined as in the state of flying and is judged as the unregistered aerial vehicle.

17 Claims, 15 Drawing Sheets

(51) Int. Cl.
    H04W 4/44      (2018.01)
    H04W 4/50      (2018.01)
    H04B 7/185     (2006.01)
    H04W 4/02      (2018.01)
    H04W 8/12      (2009.01)
    H04W 8/14      (2009.01)
    H04W 12/06     (2021.01)
    H04W 8/02      (2009.01)

(52) U.S. Cl.
    CPC ....... *G08G 5/0069* (2013.01); *H04B 7/18506* (2013.01); *H04W 4/025* (2013.01); *H04W 4/44* (2018.02); *H04W 4/50* (2018.02); *H04W 8/02* (2013.01); *H04W 8/12* (2013.01); *H04W 8/14* (2013.01); *H04W 12/06* (2013.01)

(56)         References Cited

U.S. PATENT DOCUMENTS

2018/0324662 A1*  11/2018  Phuyal ............... H04B 7/15507
2020/0077321 A1*  3/2020   Shi .................... H04W 24/04

FOREIGN PATENT DOCUMENTS

CN        106980805 A       7/2017
WO        2016154948 A1    10/2016

OTHER PUBLICATIONS

Qualcomm Incorporated, Identification of Aerial Vehicles, 3GPP TSG-RAN WG2 Meeting #98, R2-1704156, May 15-19, 2017, pp. 1-5, Hangzhou, China.

Huawei, Hisilicon, Identification of air-borne drones, 3GPP TSG-RAN WG2 Meeting #98, R2-1705000, May 15-19, 2017, pp. 1-3, Hangzhou, China.

* cited by examiner

MISUSED AERIAL USAGE IDENTIFICATION

FIELD

The subject matter disclosed herein generally relates to wireless communications and more particularly relates to misused aerial usage identification.

BACKGROUND

The following abbreviations are herewith defined, at least some of which are referred to within the following description: Third Generation Partnership Project ("3GPP"), Positive-Acknowledgment ("ACK" or "Ack"), Access Stratum ("AS"), Downlink ("DL"), Evolved Node B ("eNB"), Equipment Identity Register ("EIR"), Frequency Division Multiple Access ("FDMA"), Home Subscriber Server ("HSS"), Long Term Evolution ("LTE"), Multiple Access ("MA"), Mobility Management Entity ("MME"), Mobile Equipment ("ME"), Non-access Stratum ("NAS"), Next Generation Node B ("gNB"), Orthogonal Frequency Division Multiplexing ("OFDM"), PDN GateWay ("PGW"), Radio Resource Control ("RRC"), Access Network ("AN"), Radio Access Network ("RAN"), Radio Link Failure ("RLF"), Service Capability Exposure Function ("SCEF"), Single Carrier Frequency Division Multiple Access ("SC-FDMA"), Serving GateWay ("SGW"), User Entity/Equipment (Mobile Terminal) ("UE"), Uplink ("UL"), Worldwide Interoperability for Microwave Access ("WiMAX"), Core Access and Mobility Management Function ("AMF"), Network Exposure Function ("NEF"), Session Management Function ("SMF"), Unified Data Management ("UDM"), User Plane Function ("UPF"), Application Function ("AF"), Datacenter (DC), and Air-borne Assistance Information (ABI).

There has been increasing interest in covering the aerial vehicles such as drones with cellular networks. The use cases of commercial drones are growing very rapidly and include package delivery, search-and-rescue, monitoring of critical infrastructure, wildlife conservation, flying cameras, and surveillance. All of these use cases could see rapid growth and more will emerge in coming years. Many of these emerging use cases could benefit from connecting drones to the cellular network as a UE. LTE is well positioned to serve aerial vehicles such as drones. In fact, there have been an increasing number of field-trials involving the use of LTE networks to provide connectivity to drones. It is predicted that a rapid and vast growth in the drone industry will bring new promising business opportunities for LTE operators. To address this growing market demand, a new study item (SI) called the "Study on Enhanced LTE Support for Aerial Vehicles" has been approved by 3GPP TSG RAN #75 [1]. In this, the following enhancements were proposed:

Interference mitigation solutions for improving system-level performance in both UL and DL;

Solutions to detect whether UL signal from an air-borne UE increases interference in multiple neighboring cells and whether an air-borne UE incurs interference from multiple cells;

Identification of an air-borne UE that does not have proper certification for connecting to the cellular network while air-borne;

Handover: Identify if enhancements in terms of cell selection and handover efficiency as well as robustness in handover signaling can be achieved;

Positioning: If time allows as the 2nd priority, assess the achievable accuracy with existing positioning techniques and identify potential enhancements.

The solutions related with drone UE are mainly discussed in RAN 2 now. The following contributions have been submitted to RAN 2 meeting.

1. R2-1704997, Mobility enhancement for Drones, Huawei, HiSilicon

This contribution considers and lists a lot of possible enhancements, which are listed as follows. However, no additional detailed information is exposed.

1. Mobility control parameters optimization (TTT, CIO etc.)
2. Enhance the measurement report
3. RLF & re-establishment
4. Coordinated scheduling
5 Interference control
6. UE Mobility status evaluation
7. Introduce speed based handover strategy
8. Utilize beamforming technology to improve downlink signal quality
9. Enhanced proximity indication procedure
10. Pre-handover configuration according to drone's fixed flying path information 2. R2-1705999, Proposal of potential LTE enhancements for Aerial Vehicles, KDDI This contribution proposed the following solutions to enhance handover procedure: change the handover related parameters (time to trigger, event threshold . . . etc.); introduce handover prohibit timer mechanism; and activate joint transmission.

However, there are as yet no discussions related with drone UE in SA2. The solution proposed in this disclosure is mainly related to a network capability exposure feature (TS 23.682) and an attach procedure (TS 23.401).

REFERENCES

[1] RP-170779, "New SID on Enhanced Support for Aerial Vehicles", NTT DOCOMO INC., Ericsson.

[2] R2-1705999, "Proposal of Potential LTE Enhancements for Aerial Vehicles", KDDI

[3] R2-1704997, "Mobility Enhancement for Drones", Huawei, HiSilicon

The above references are identified by the RAN group from the radio aspect. However, there exist other problematic issues which also need to be solved.

BRIEF SUMMARY

Method, base unit and control node for misused aerial usage identification are disclosed.

In one embodiment, a method comprises receiving location information of a mobile unit; judging whether the mobile unit is a registered aerial vehicle or an unregistered aerial vehicle; determining whether the mobile unit is in the state of flying based on the location information of the mobile unit; and identifying the mobile unit as a misused aerial vehicle in the condition that the mobile unit is determined as being in the state of flying and is judged as being an unregistered aerial vehicle.

In one embodiment, in response to identifying the mobile unit as the misused aerial vehicle, the method stops serving the mobile unit.

In one embodiment, in the condition that the mobile unit is judged as being an unregistered aerial vehicle, the determining of whether the mobile unit is in the state of flying is performed. Preferably, in the condition that air-borne assistance information is not stored at a base unit, the mobile unit is judged by the base unit as being an unregistered aerial vehicle. In one embodiment, a control node sends the air-borne assistance information to the base unit. Preferably, the control node sends the air-borne assistance information to the base unit no matter whether the air-borne assistance information is empty. In some embodiments, the air-borne assistance information is empty. In some embodiments, the air-borne assistance information comprises at least one of an expected altitude range, a mobility pattern, path information, an altitude restriction and a speed restriction. In some embodiments, the base unit sends location information of the mobile unit to a location platform to determine whether the mobile unit is in the state of flying.

In another embodiment, in the condition that the mobile unit cannot be judged as the registered aerial vehicle, the determining of whether the mobile unit is in the state of flying is performed. Preferably, in the condition that air-borne assistance information is not stored at a base unit, the mobile unit cannot be judged by the base unit as the registered aerial vehicle. In one embodiment, in the condition that air-borne assistance information is not stored at a base unit, the mobile unit cannot be judged by the base unit as being the registered aerial vehicle. Preferably, in the condition that the mobile unit cannot be judged by the base unit as being the registered aerial vehicle, the base unit requests a control node to determine whether the mobile unit is the registered aerial vehicle or the unregistered aerial vehicle. In some embodiments, in the condition that the air-borne assistance information is not stored at the control node, the mobile unit is judged by the control node as the unregistered aerial vehicle, and in the condition that the air-borne assistance information is stored at the control node, the mobile unit is judged by the control node as the registered aerial vehicle. In some embodiments, a control node sends the air-borne assistance information that is not empty to the base unit. In some embodiments, the air-borne assistance information comprises at least one of an expected altitude range, a mobility pattern, path information, an altitude restriction and a speed restriction.

In one embodiment, a base unit comprises: a transceiver that receives location information of a mobile unit; and a processor that: judges whether the mobile unit is a registered aerial vehicle or an unregistered aerial vehicle; determines whether the mobile unit is in the state of flying based on the location information of the mobile unit; and identifies the mobile unit as a misused aerial vehicle in the condition that the mobile unit is determined as in the state of flying and is judged as the unregistered aerial vehicle.

In one embodiment, a control node comprises: a transceiver that receives from a base unit a request for stopping serving a mobile unit; and a processor that stops serving the mobile unit upon receiving the request.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7-1 is a schematic illustrating one embodiment of location platform deployment;

FIG. 7-2 is a schematic illustrating another embodiment of location platform deployment;

FIG. 8-1 is a schematic diagram illustrating a first embodiment of misused aerial usage identification;

FIG. 8-2 is a schematic flow chart diagram illustrating the first embodiment of misused aerial usage identification;

FIG. 9-1 is a schematic diagram illustrating a second embodiment of misused aerial usage identification;

FIG. 9-2 is a schematic flow chart diagram illustrating the second embodiment of misused aerial usage identification;

FIG. 10-1 is a schematic diagram illustrating a third embodiment of misused aerial usage identification;

FIG. 10-2 is a schematic flow chart diagram illustrating the third embodiment of misused aerial usage identification;

FIG. 11-1 is a schematic diagram illustrating a fourth embodiment of misused aerial usage identification;

FIG. 11-2 is a schematic flow chart diagram illustrating the fourth embodiment of misused aerial usage identification;

DETAILED DESCRIPTION

Figure 1:
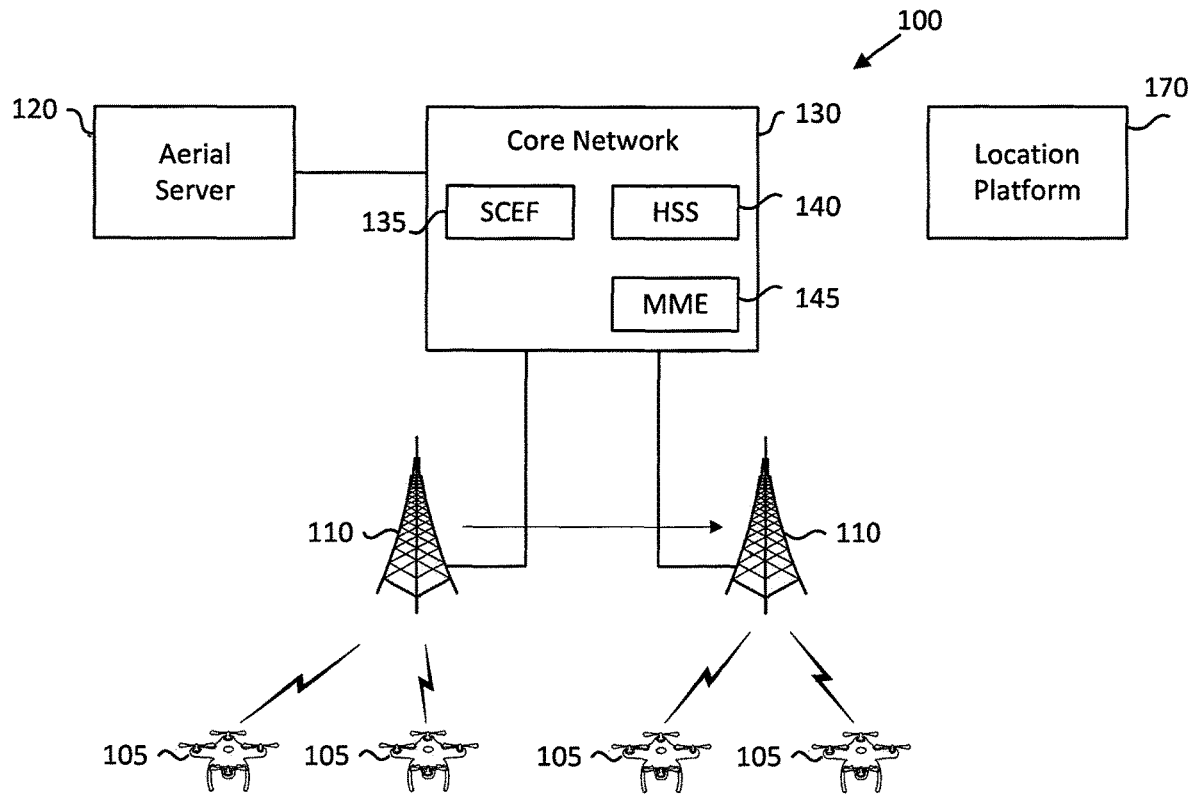
FIG. 1 is a schematic block diagram illustrating one embodiment of a wireless communication system.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled "modules", in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory ("RAM"), read-only memory ("ROM"), erasable programmable read-only memory ("EPROM" or Flash memory), portable compact disc read-only memory ("CD-ROM"), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100. In one embodiment, the wireless communication system 100 includes mobile units 105, and base units 110, a core network 130 and an aerial server 120. A location platform 170 is also included in the wireless communication system 100. Even though a specific number of mobile units 105 and base units 110 are depicted in FIG. 1, one skilled in the art will recognize that any number of mobile units 105 and base units 110 may be included in the wireless communication system 100. Similarly, even though only one core network 130 and only one aerial server 120 are depicted in FIG. 1, one skilled in the art will recognize that more core networks 130 and more aerial servers 120 could be included in the wireless communication system 100.

In one embodiment, the mobile units 105 may include aerial vehicles such as drones or the like. Examples of use cases of drones include package delivery, search-and-rescue, monitoring of critical infrastructure, wildlife conservation, flying cameras, and surveillance. The mobile units 105 may be referred to as remote units, subscriber units, mobiles, mobile stations, users, terminals, mobile terminals, UEs, subscriber stations, user terminals, a device, or by other terminology used in the art. The mobile units 105 may communicate wirelessly with one or more of the base units 110.

The base units 110 may be distributed over a geographic region. In certain embodiments, a base unit 110 may also be referred to as an access point, an access terminal, a base, a base station, a Node-B, an eNB, a gNB, a Home Node-B, a relay node, a device, or by any other terminology used in the art. The base units 110 connect to the core network 130, which may be coupled to other networks, like the Internet and public switched telephone networks, among other networks, such as the aerial server.

In one implementation, the wireless communication system 100 is compliant with the LTE of the 3GPP protocol. More generally, however, the wireless communication system 100 may implement some other open or proprietary communication protocol. The present disclosure is not intended to be limited to the implementation of any particular wireless communication system architecture or protocol.

The base units 110 may serve a number of mobile units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain.

In one embodiment, the core network 130 is an evolved packet core ("EPC"). In another embodiment, the core network 130 may be a 5G core network. The core network 130 may be coupled to an external server such as the aerial server 120. The present disclosure is not intended to be limited to the implementation of any particular wireless communication system architecture or protocol.

The core network 130 includes several network elements. As depicted, the core network 130 includes a SCEF 135, a HSS 140, and a MME 145. Although a specific number of MME 145 is depicted in FIG. 1, one skilled in the art will recognize that any number of MMEs 145 may be included in the core network 130. Although SCEF 135, HSS 140 and MME 145 are described in the embodiment, a person skilled in the art will recognize that, in 5G network, a Network Exposure Function ("NEF") is equivalent to SCEF, a Unified Data Management ("UDM") is equivalent to HSS, and a Core Access and Mobility Management Function ("AMF") is equivalent to MME. Incidentally, in 5G network, a Session Management Function ("SMF") is equivalent to SGW, a User Plane Function ("UPF") is equivalent to PGW, an Application Function is equivalent to an external server.

The MME 145 is a control plane network element that handles signaling related to mobility and security for the mobile units 105. The MME may be referred to as a control node. The MME 145 is a termination point for a NAS connection of the remote unit 105 to the core network 130. The MME 145 may stop serving a mobile unit 105 due to various reasons. The HSS 140 is a server that is used for storing subscription information. The SCEF 135 is an apparatus that connects the core network 130 with external servers such as the aerial server 120, among others.

The aerial server 120 is a server that holds information related to mobile units 105, and in particular, related to aerial vehicles. The aerial server 120 holds subscription information configuration that will be explained in detail with reference to FIG. 2. The SCEF 135 authenticates the aerial server 120.

The location platform 170 may be connected to the MME 145 or the base units 110. The detailed description of the location platform 170 will be discussed later with reference to FIGS. 7-1 and 7-2.

Figure 2:
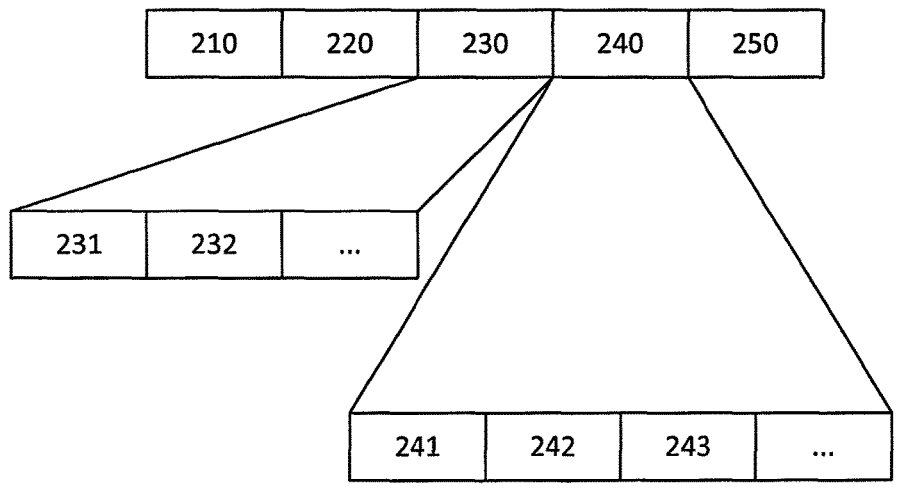
FIG. 2 is a schematic block diagram illustrating one embodiment of a subscription information configuration.

FIG. 2 illustrates a subscription information configuration 200 that is communicated from the aerial server 120 to the core network 130, according to embodiments of the disclosure. A preferred embodiment of the subscription information configuration 200 includes an AS identity 210, a UE identity 220, mobility restrictions 230 and air-borne assistance information (ABI) 240. A timer information 250 is optionally included in the subscription information configuration 200.

The AS identity 210 is an identity of an aerial server 120. Although FIG. 1 only shows one aerial server 120, a person skilled in the art will recognize that any numbers of aerial servers 120 may be included in the wireless communication system 100. Each aerial server 120 has its unique AS identity 210.

The UE identity 220 is an identity of a mobile unit 105. One aerial server 120 may hold subscription information configuration 200 for any numbers of mobile units 105. Each mobile unit 105 has its unique UE identity 220.

The mobility restrictions 230 serve as a restriction to the behavior of the mobile unit 105. For example, an aerial vehicle, which is a preferred embodiment of the mobile unit 105, may fly much higher than the height for which a base unit is allowed to provide connection. Therefore, a restriction on the height of the aerial vehicle is necessary.

A preferred embodiment of the mobility restrictions 230 includes altitude restriction 231, speed restriction 232, and etc. The altitude restriction 231 defines the maximum altitude of the mobile unit 105. If the mobile unit 105 flies beyond the altitude restriction, the mobile unit 105 may not be able to communicate with the base unit 110 or the mobile unit 105 will not be allowed to communicate with the base unit 110. The speed restriction 232 defines the maximum speed of the mobile unit 105. If the mobile unit 105 flies beyond the speed restriction, the mobile unit 105 may not be able to communicate with the base unit 110 or the mobile unit 105 will not be allowed to communicate with the base unit 110.

The air-borne assistance information (ABI) 240 serves as information that may help the base unit configure its parameters to provide a suitable service. The ABI 240 can also be seen as an indication of whether or not a mobile unit 105 can be used as an aerial vehicle. A preferred embodiment of the air-borne assistance information 240 includes an expected altitude range 241, a mobility pattern 242, path information 243 and etc. The air-borne assistance information 240 may be set by the aerial server 120. Alternatively, the air-borne assistance information 240 may be predetermined by the core network 130.

The expected altitude range 241 is a preferred height range by which the mobile unit 105 flies. The mobility pattern 242 is a parameter or a set of parameters that may be used by the core network to characterize and optimize the UE mobility. The mobility pattern 242 can be used by the MME or AMF to optimize mobility support provided to the mobile unit, for example, tracking/registration area list allocation. For example, the mobility pattern 242 may be an expected speed range, which is a preferred speed range by which the mobile unit 105 flies. The path information 243 refers to the path along which the mobile unit 105 flies. In one embodiment, the air-borne assistance information (ABI) 240 may include at least one of the expected altitude range 241, the mobility pattern 242 and the path information 243. In another embodiment, the air-borne assistance information (ABI) 240 may include other information. In yet another embodiment, the air-borne assistance information (ABI) 240 may be empty. In other words, an empty air-borne assistance information (ABI) 240 is also a valid ABI.

In some embodiments, the mobility restrictions 230 can be combined into the air-borne assistance information (ABI) 240. That is, the air-borne assistance information (ABI) 240 may include all of the altitude restriction 231, the speed restriction 232, the expected altitude range 241, the mobility pattern 242 and the path information 243. In this embodiment, the air-borne assistance information (ABI) 240 is a container that contains information or parameters related to aerial vehicles. Needless to say, the air-borne assistance information (ABI) 240 may include other parameters related to aerial vehicles.

The timer information 250 may be optionally included in the subscription information configuration 200. The timer information 250 may define the expiration time of the subscription information configuration 200. For example, the timer information 250 may be duration of time such as one week, one day, several hours (e.g. 5 hours) or the like. The timer information 250 indicates that after the duration of time (e.g. 5 hours), the subscription information configuration 200 becomes invalid.

Figure 3:
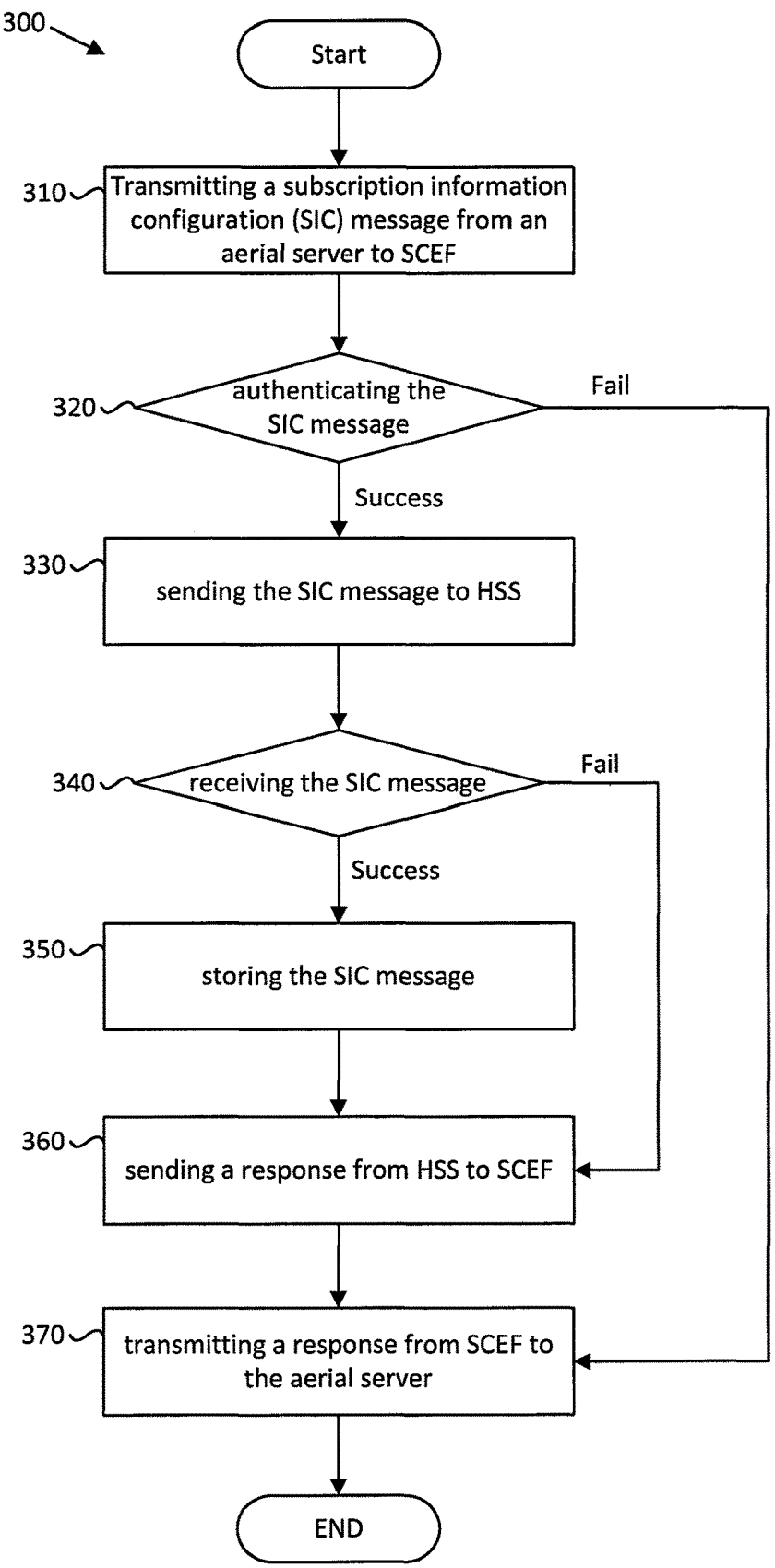
FIG. 3 is a schematic flow chart diagram illustrating one embodiment of a method for subscription information configuration.

FIG. 3 depicts a method (300) for subscription information configuration, according to embodiments of the disclosure. In some embodiments, the method (300) is performed by apparatuses, such as the aerial server 120, the SCEF 135, and HSS 140. In certain embodiments, the method (300) may be performed by a processor executing program code, for example, a microcontroller, a microprocessor, a CPU, a GPU, an auxiliary processing unit, a FPGA, or the like.

The method (300) starts and transmits (310) a subscription information configuration message from the aerial server 120 to the SCEF 135. The transmission of the subscription information configuration message may be initiated by the aerial server 120. Alternatively, the transmission of the subscription information configuration message may be in response to a request by the HSS 140.

As depicted in FIG. 2, the subscription information configuration includes the AS identity 210, the UE identity 220, the mobility restrictions 230 and the air-borne assistance information (ABI) 240 and optionally the timer information 250. A person skilled in the art may recognize that the subscription information configuration message may not include all of these contents. For example, the mobility restrictions 230 may not be included. In other words, a subscription information configuration message including only the air-borne assistance information (ABI) 240 may be transmitted to the SCEF 135. As described above, the air-borne assistance information (ABI) 240 may also be empty.

The method further includes authenticating (320) the subscription information configuration message at the SCEF 135. The SCEF 135 judges whether the AS identity 210 and the UE identity 220 are valid. If this judgment is successful, the SCEF 135 sends (330) the subscription information configuration message to the HSS 140. If this judgment is not successful, the method goes to step 370 that will be discussed later.

The method (300) further includes receiving (340) the subscription information configuration message at the HSS 140. If the receiving is successful, the HSS 140 stores (350) the subscription information configuration message. If the receiving is not successful, the method goes to step 360 that will be discussed later.

In step 350, the HSS 140 stores the subscription information configuration message. If an existing subscription information configuration message for a particular mobile unit 105 has been stored at the HSS 140, the HSS may replace the existing subscription information configuration message with the newly received subscription information configuration message.

As described above, the mobility restrictions 230 may be combined into the air-borne assistance information (ABI) 240. That is, the air-borne assistance information (ABI) 240 may include the altitude restriction 231, the speed restriction 232, the expected altitude range 241, the mobility pattern 242, the path information 243 and etc. All of the altitude restriction 231, the speed restriction 232, the expected altitude range 241, the mobility pattern 242 and the path information 243 are optional parameters. That is, all of the altitude restriction 231, the speed restriction 232, the expected altitude range 241, the mobility pattern 242 and the path information 243 may be empty, and therefore, the air-borne assistance information (ABI) 240 may be empty. An empty air-borne assistance information (ABI) 240 is still valid air-borne assistance information (ABI) 240.

The method further includes sending (360) a response from the HSS 140 to the SCEF 135. If the receiving of the subscription information configuration message fails at step 340, a response including a cause value to indicate the failure of the receiving is sent to the SCEF 135. If the receiving of the subscription information configuration message is successful at step 340, after the storing of the subscription information configuration message or the replacement of the existing subscription information configuration message is performed at the step 350, a response including a cause value to indicate the success of the receiving is sent to the SCEF 135.

The method further includes transmitting (370) a response from the SCEF 135 to the aerial server 120. If the authentication fails in step 320, a response containing a cause value to indicate the failure of the authentication is sent to the aerial server 120. If a response including the cause value to indicate the failure or the success of the receiving is received from the HSS 140, the same response is sent from the SCEF 135 to the aerial server 120.

Figure 4:
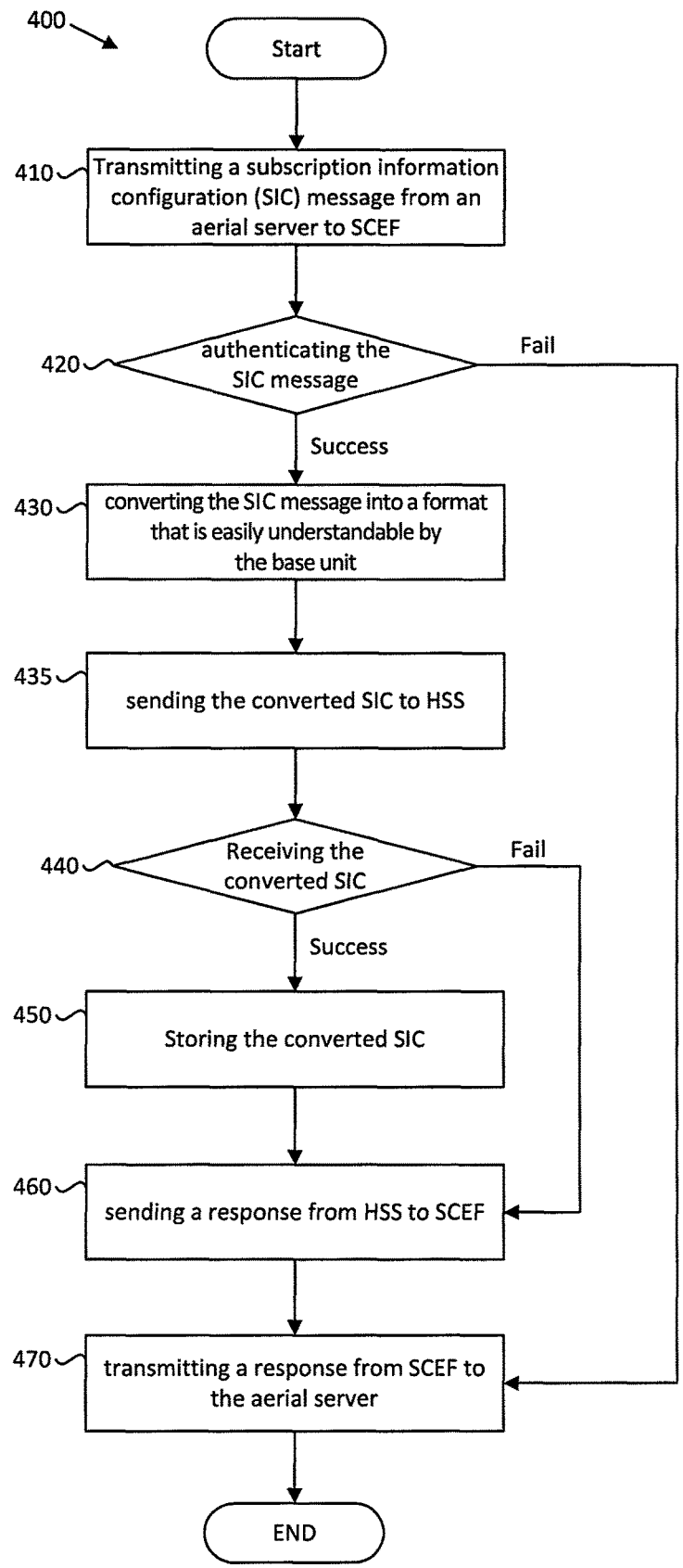
FIG. 4 is a schematic flow chart diagram illustrating another embodiment of a method for subscription information configuration.

FIG. 4 depicts another method (400) for subscription information configuration, according to embodiments of the disclosure. The method (400) differs from the method (300) mainly in the steps 430, 435 and 450. The other steps 410, 420, 440, 460 and 470 are the same as the steps 310, 320, 340, 360 and 370.

In step 330 of FIG. 3, SCEF 135 sends the subscription information configuration message to the HSS 140. On the other hand, according to the embodiment depicted in FIG. 4, the SCEF 135 converts 430 the subscription information configuration 200 into a format that is easily understandable by the base unit 110.

In some embodiments, only a part of the subscription information configuration 200 is converted.

For example, the path information 243 may be converted to a base unit list or a cell list. The list preferably contains an access order. The path information transmitted from the aerial server 120 may include a particular route that a mobile unit 105 will travel.

In step 435, the SCEF 135 sends the converted subscription information configuration to the HSS 140. In step 440, the HSS 140 receives the converted subscription information configuration. In step 450, the HSS 140 stores the converted subscription information configuration. Alternatively, the HSS 140 may replace the existing converted subscription information configuration with the newly received converted subscription information configuration.

Figure 5:
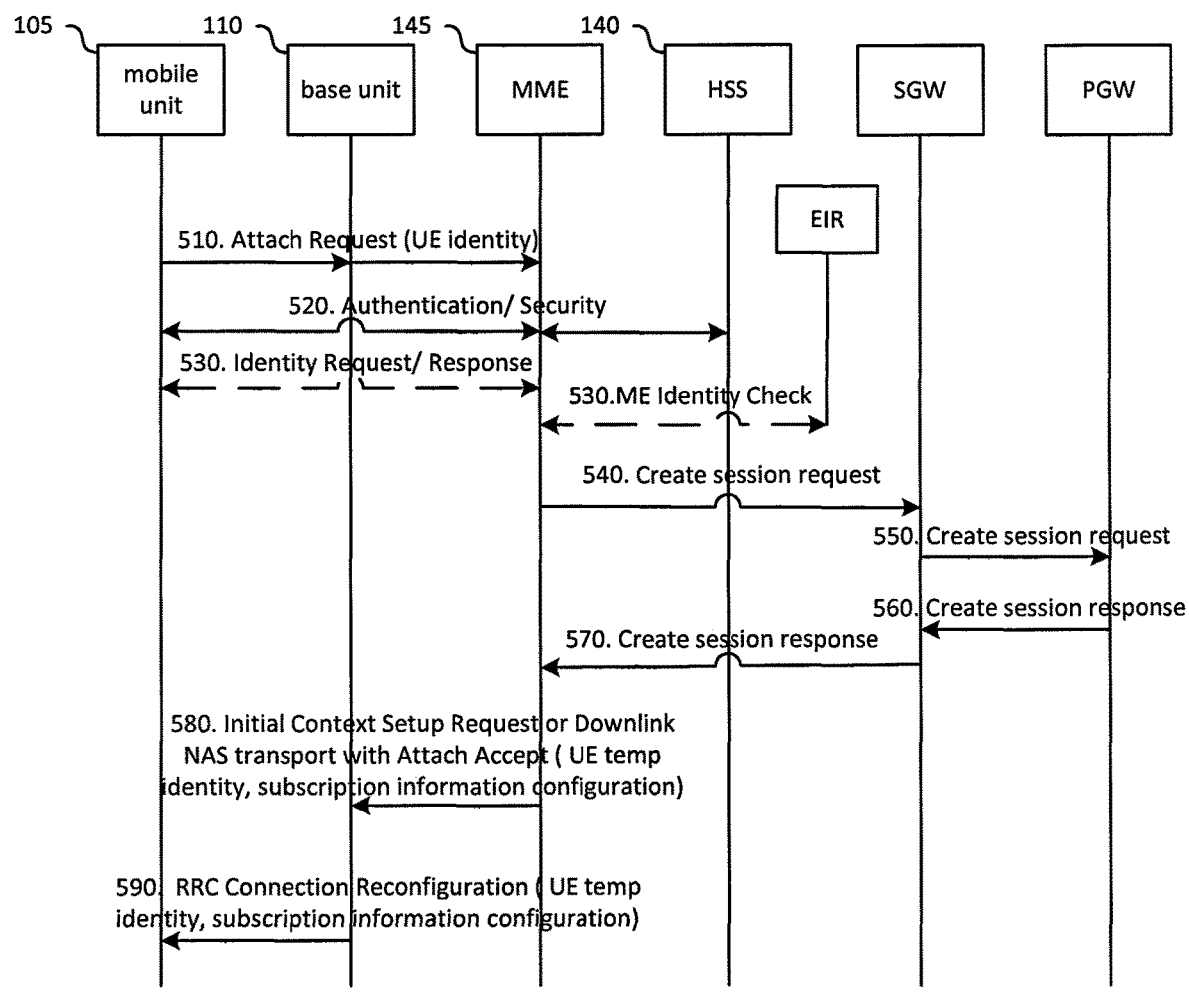
FIG. 5 is a schematic diagram illustrating one embodiment of an attach procedure.

FIG. 5 illustrates an attach procedure 500, according to embodiments of the disclosure.

In step 510, a mobile unit 105 sends an Attach Request to the MME 145.

In step 520, the HSS 140 authenticates the mobile unit 105 and sets up NAS security to activate integrity protection and NAS ciphering. If the authentication succeeds, the HSS 140 sends the subscription information configuration 200 as subscription information of the mobile unit 105 to the MME 145. As illustrated in FIG. 2, the subscription information configuration 200 includes the air-borne assistance information (ABI) 240 and the mobility restrictions 230. The mobility restrictions 230 may not be included in the subscription information configuration 200. Further, the air-borne assistance information (ABI) 240 included in the subscription information configuration 200 may be empty. In the condition that the mobility restrictions 230 are combined into the air-borne assistance information (ABI) 240, the combined air-borne assistance information (ABI) 240 may also be empty. As explained earlier, the subscription information configuration 200 may preferably be the converted subscription information configuration that is easily understandable by the base unit.

In step 530, an ME Identity (IMEISV) shall be retrieved from the mobile unit 105. The ME identity shall be transferred encrypted. In order to minimize signaling delays, the retrieval of the ME Identity may be performed at the same time as the NAS security setup in step 520. The MME 145 may send the ME Identity Check Request (ME Identity, IMSI) to an EIR. The EIR shall respond with ME Identity Check Ack (Result). Depending upon the Result, the MME 145 decides whether to continue with this attach procedure or to reject the mobile unit.

In step 540, the MME sends the Create session request to SGW.

In step 550, the SGW sends Create session request to PGW.

In step 560, the PGW sends Create session response to SGW.

In step 570, the SGW sends Create session response to MME.

In step 580, the MME sends Initial Context Setup Request or Downlink NAS transport with Attach Accept to the base unit. This message includes UE temp identity (GUTI) and the subscription information configuration 200 (or the converted subscription information configuration). The base unit may use the subscription information configuration 200 (or the converted subscription information configuration) to set specific parameters.

In step 590, the base unit sends RRC Connection Reconfiguration to the mobile unit. This message includes UE temp identity and the subscription information configuration 200 (or the converted subscription information configuration).

In the attach procedure, the subscription information configuration is received at the base unit. The base unit may set its parameters according to the subscription information configuration 200. As described earlier, the subscription information configuration 200 includes at least the air-borne assistance information (ABI) 240. The air-borne assistance information (ABI) 240 may include at least one of the expected altitude range 241, the mobility pattern 242 and the path information 243. Alternatively, the air-borne assistance information (ABI) 240 may be empty. In the condition that the mobility restrictions 230 are combined into the air-borne assistance information (ABI) 240, the combined air-borne assistance information (ABI) 240 may include at least one of the altitude restriction 231, the speed restriction 232, the expected altitude range 241, the mobility pattern 242 and the path information 243, or may be empty. In the condition that the air-borne assistance information (ABI) 240 of a particular mobile unit, which either is empty or includes at least one of the expected altitude range 241, the mobility pattern 242 and the path information 243 (or includes at least one of the altitude restriction 231, the speed restriction 232, the expected altitude range 241, the mobility pattern 242 and the path information 243), is received and stored at the base unit 110, the particular mobile unit is regarded as being a registered aerial vehicle. On the other hand, if no air-borne assistance information (ABI) 240 of a certain mobile unit is received at the base unit, the certain mobile unit will be regarded as being an unregistered aerial vehicle. Preferably, the subscription information configuration is received at the mobile unit. The mobile unit may adjust its own flying parameters according to the subscription information configuration.

Figure 6:
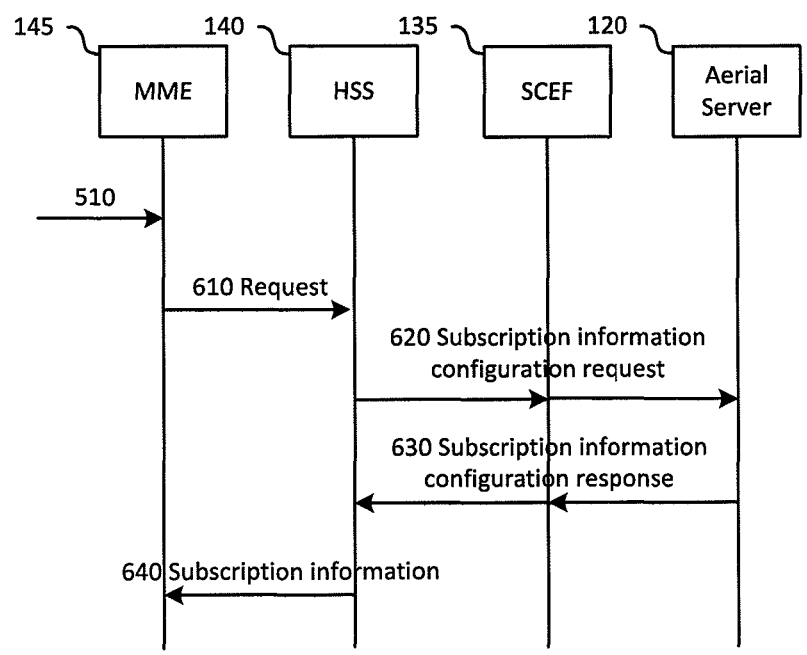
FIG. 6 is a schematic diagram illustrating a detailed embodiment of the step 520 of the attach procedure.

FIG. 6 illustrates a detailed embodiment of the step 520 of FIG. 5. In FIG. 6, the communications of step 520 are performed among the mobile unit 105, the MME 145 and the HSS 140. FIG. 6 describes in detail the communications performed between the MME 145 and the HSS 140. In step 610, the MME 145 sends a request to the HSS 140 for the subscription information configuration 200. As discussed earlier with reference to FIG. 5, if the authentication by the HSS 140 succeeds, the HSS 140 sends the subscription information configuration 200 as subscription information of the mobile unit 105 to the MME 145.

However, there may exist a situation in which a valid subscription information configuration 200 is unavailable at the HSS 140. For example, the HSS may not receive any subscription information configuration 200. Alternatively, the timer information 250 of the subscription information configuration 200 may indicate that the duration of time for the subscription information configuration 200 has expired in the HSS 140. In this condition, since no valid subscription information configuration 200 is stored at the HSS 140, the HSS 140 is unable to authenticate the UE as an aerial UE and unable to send the aerial usage related subscription information configuration 200 to the MME 145.

In the condition that no valid subscription information configuration 200 is stored at the HSS 140, the HSS 140, in step 620, sends a request to the aerial server 120 via the SCEF 135 to request for the subscription information configuration 200. In response, the aerial server 120, in step 630, sends a response message including the subscription information configuration 200 to the HSS 140. The step 630 may be implemented by the method 300 shown in FIG. 3 or the method 400 shown in FIG. 4. In step 640, the HSS 140 sends the subscription information configuration 200 as part of subscription information of the mobile unit 105 to the MME 145.

The timer information 250 has been discussed as a part of the subscription information configuration 200. The timer information 250 defines the expiration time of the subscription information configuration 200 in the HSS 140. Therefore, according to an embodiment, the subscription information configuration 200 or the converted subscription information configuration contains the timer information 250 when it is stored at the HSS 140. The subscription information configuration 200 or the converted subscription information configuration sent to the base unit 110, as shown in step 580 of FIG. 5, may not contain the timer information 250. Needless to say, the subscription information configuration 200 or the converted subscription information configuration sent to the mobile unit 105, as shown in step 590 of FIG. 5, may not contain the timer information 250 either.

The step 580 of FIG. 5 indicates that the subscription information configuration 200 is sent from the MME 145 to the base unit 110. The subscription information configuration 200 may be also communicated between different MMEs or between different base units.

As described above, the air-borne assistance information (ABI) 240 is contained in the subscription information configuration 200. Therefore, when the MME 145 sends the subscription information configuration 200 to the base unit 110, the air-borne assistance information (ABI) 240 is sent to the base unit 110. Once the base unit 110 receives the air-borne assistance information (ABI) 240 of a particular mobile unit 105, the base unit 110 considers that the particular mobile unit 105 is a registered aerial vehicle. If the base unit 110 does not receive the air-borne assistance information (ABI) 240 of the particular mobile unit 105, the base unit 110 considers that the particular mobile unit 105 may be an unregistered aerial vehicle. In the condition that the particular mobile unit 105 that is an unregistered aerial vehicle is in the state of flying, the particular mobile unit 105 may be regarded as being a misused aerial vehicle, which would cause the MME 145 to stop serving the particular mobile unit.

In the step 580, the MME 145 sends the subscription information configuration 200 including the air-borne assistance information (ABI) 240 to the base unit 110. The MME 145 can have different behaviors to send the air-borne assistance information (ABI) 240 to the base unit 110.

As described above, the air-borne assistance information (ABI) 240 may be empty or includes at least one of the altitude restriction 231, the speed restriction 232, the expected altitude range 241, the mobility pattern 242 and the path information 243 (or includes at least one of the expected altitude range 241, the mobility pattern 242 and the path information 243). In behavior 1 of the MME, the MME 145 sends the ABI 240 to the base unit 110, no matter whether or not the ABI 240 is empty. In other words, in the behavior 1, the MME 145 does not check whether or not the ABI 240 is empty.

In behavior 2 of the MME, the MME 145 first checks whether or not the ABI 240 is empty. Only in the condition that the ABI 240 is not empty, the MME 145 sends the non-empty ABI 240 to the base unit 110. That is, in the behavior 2 of the MME, the MME 145 does not send an empty ABI 240 to the base unit 110.

Therefore, in the behavior 1 of the MME, the base unit 110 will receive the air-borne assistance information (ABI) 240 of all of the registered aerial vehicles, even if the air-borne assistance information (ABI) 240 of some of the registered aerial vehicles are empty. In this condition, the base unit 110 knows whether a mobile unit is a registered aerial vehicle.

In the behavior 2 of the MME, the base unit 110 only receives the air-borne assistance information (ABI) 240 of registered aerial vehicles that are not empty. Therefore, when the base unit 110 does not receive the air-borne assistance information (ABI) 240 of a particular mobile unit, there may exist two situations: one situation is that the particular mobile unit does not have the air-borne assistance information (ABI) 240 (i.e. the aerial server has not sent the subscription information configuration 200, including the air-borne assistance information (ABI) 240 to the HSS 140 and/or the MME 145) and therefore is an unregistered aerial vehicle; and the other situation is that the particular mobile unit has an empty air-borne assistance information (ABI) 240 and therefore is a registered aerial vehicle.

Due to various reasons, the network may choose to only provide particular service(s) to registered aerial vehicles. That is, if a mobile unit is an unregistered aerial vehicle, the network may choose to stop providing services to the mobile unit that is the unregistered aerial vehicle.

A mobile unit is determined as a registered aerial vehicle or an unregistered aerial vehicle based on the air-borne assistance information (ABI) 240 of the mobile unit, in particular, based on whether the air-borne assistance information (ABI) 240 of the mobile unit is stored at the base unit 110 or at the MME 145. In addition, the mobile unit should be checked on whether it is in the state of flying. A mobile unit that is NOT in the state of flying is considered as being a normal mobile unit. The network may provide normal services to the normal mobile unit if the network has authenticated the UE.

A location platform is deployed in the mobile network to help check whether or not a mobile unit is in the state of flying. The location platform stores the location information of a certain area. Preferably, the location information is three dimensional (3D) information. Depending on the cover area of the location platform, different scenarios can be set up.

Figures 1, 7:
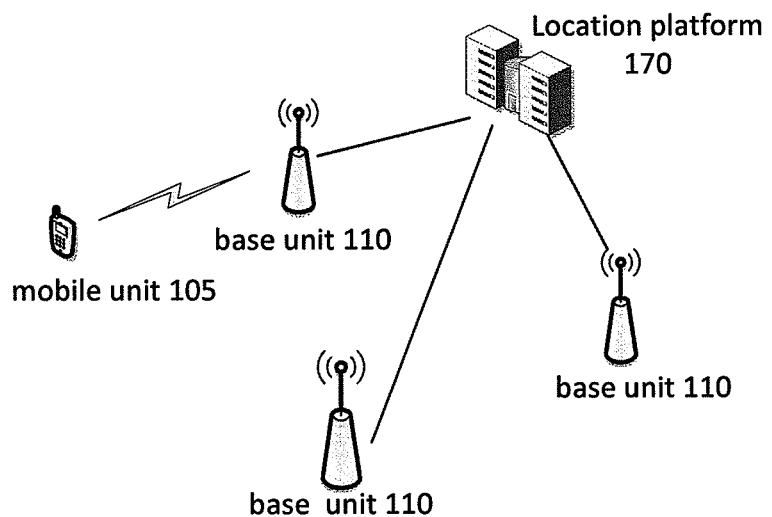
Figures 2, 7:
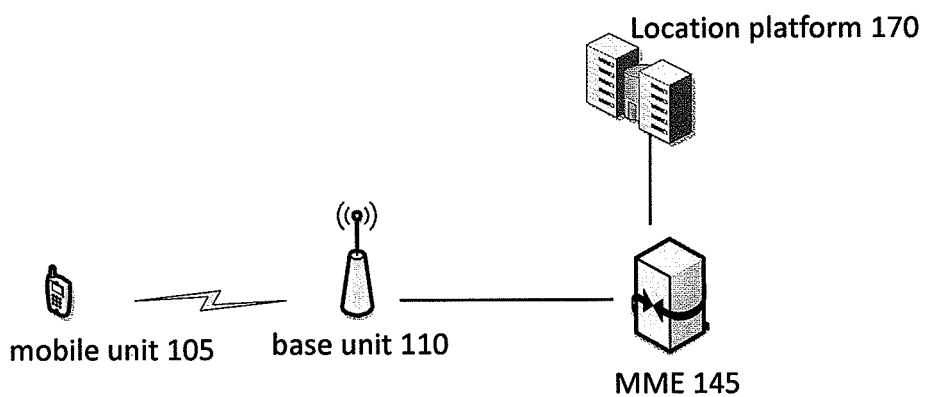

FIG. 7-1 illustrates one embodiment of location platform deployment. The location platform 170 is deployed within a local datacenter (DC). In this situation, the base units 110 may be connected directly to the location platform 170.

FIG. 7-2 illustrates another embodiment of location platform deployment. The location platform 170 is deployed within a center datacenter (DC). In this situation, the location platform 170 is connected to the MME 145, instead of to the base unit(s) 110.

Figures 1, 8:
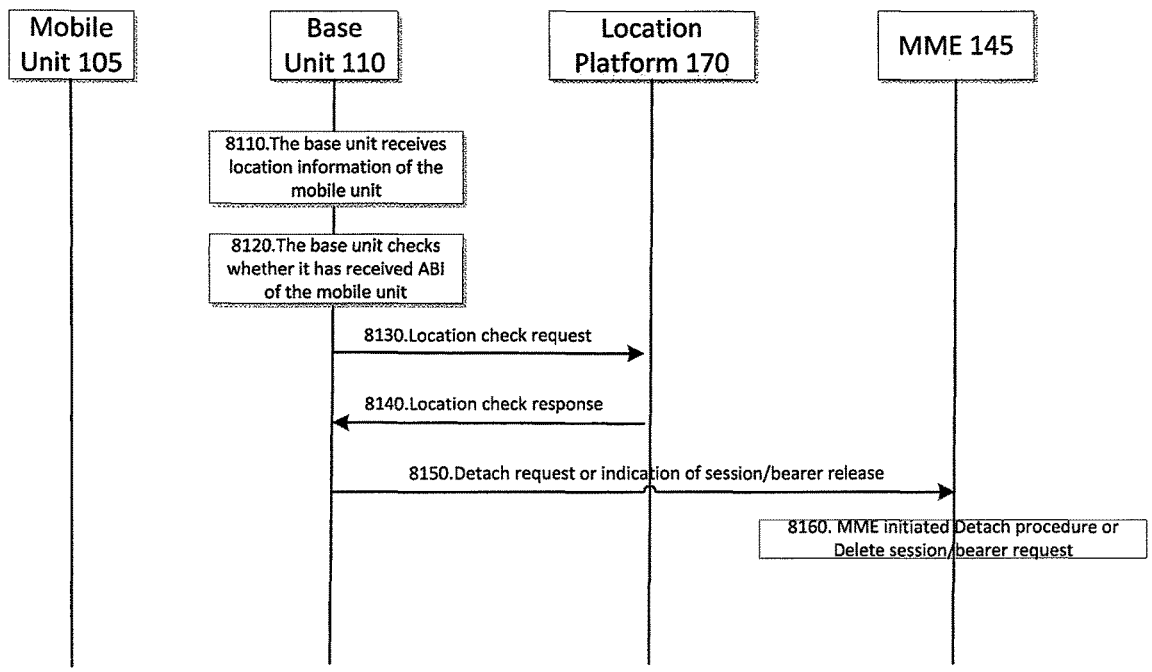
Figures 2, 8:
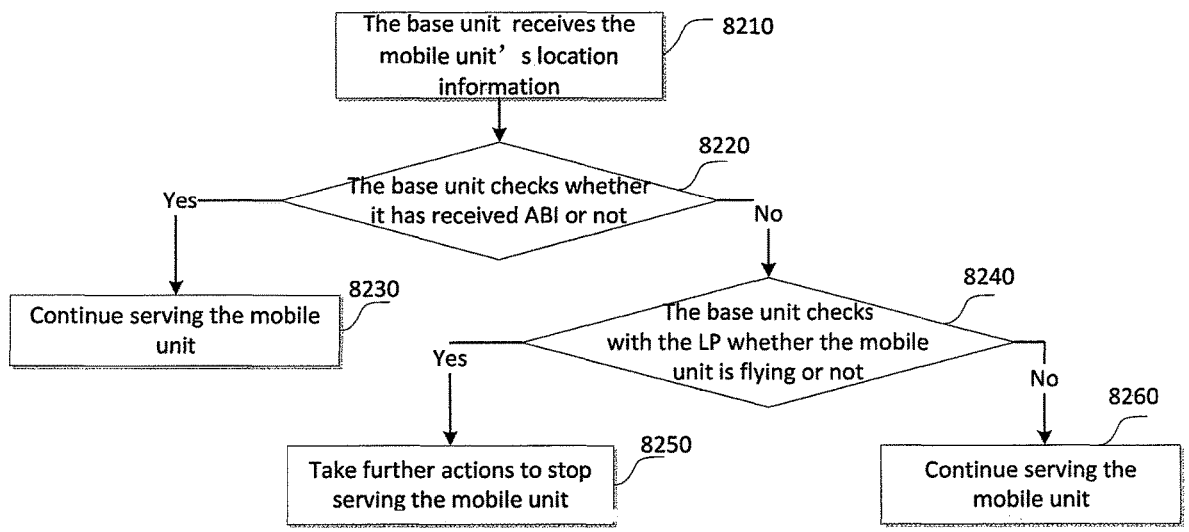

FIG. 8-1 illustrates a first embodiment of misused aerial usage identification. In the first embodiment, it is assumed that the MME complies with its behavior 1 and the location platform is deployed as illustrated in FIG. 7-1. That is, in the first embodiment, the MME 145 sends the ABI 240 to the base unit 110 no matter whether or not the ABI 240 is empty. In addition, the location platform is connected directly to the base unit 110.

In step 8110, the base unit 110 receives location information of the mobile unit 105. Preferably, the location information of the mobile unit 105 is comprised of three dimensional coordinates of the place where the mobile unit 105 resides. More preferably, the three dimensional coordinates may be Cartesian coordinates. Alternatively, the three dimensional coordinates may be represented by polar coordinates.

In step 8120, the base unit 110 checks whether it has received air-borne assistance information (ABI) 240 of the mobile unit 105. Because in behavior 1 of the MME, the MME sends the air-borne assistance information (ABI) 240 of all of registered aerial vehicles, the receipt of the ABI 240 of the mobile unit 105 in the first embodiment means that the mobile unit 105 is a registered aerial vehicle. In this condition, the base unit 110 continues serving the mobile unit 105 that is the registered aerial vehicle. The steps 8130-8160 will not be performed in the condition that the mobile unit 105 is the registered aerial vehicle.

On the other hand, if the base unit 110 has not received the ABI 240 of the mobile unit 105, the base unit 110 considers that the mobile unit 105 is an unregistered aerial vehicle. In this condition, the method proceeds to step 8130.

In the step 8130, the base unit 110 sends a location check request to the location platform 170. The location check request includes the location information of the mobile unit 105, which is preferably the three dimensional coordinates of the mobile unit 105.

As described above, the location platform stores the location information (e.g. three dimensional information) of the area where the mobile unit 105 resides. Therefore, based on the comparison between the location information of the mobile unit 105 and the location information of the area where the mobile unit 105 resides, whether or not the mobile unit 105 is in the state of flying can be determined.

In some embodiments, the location information of the mobile unit 105 may be represented as X, Y, Z, in which X and Y represent two dimensional coordinates of the mobile unit 105 while Z represents an altitude of the mobile unit 105. In the embodiments, the location platform 170 stores the location information (e.g. three dimensional information) of the area where the mobile unit 105 resides. At the location platform 170, all of the valid locations, at which the mobile unit is considered as not being in the state of flying, can be identified by comparing the location information of the mobile unit 105 with the location information (e.g. three dimensional information) of the area where the mobile unit 105 resides. For example, if the mobile unit 105 is in a place where Z is much more than zero, this implies that the mobile unit 105 is in the air. Based on the check at the location platform 170, if the place is in a high building, the mobile unit 105 is regarded as NOT being in the state of flying. As a whole, after receiving the location information (e.g. the three dimensional coordinates) of the mobile unit 105, the location platform 170 can check whether the location information of the mobile unit 105 is valid, which means that it has high possibility that the mobile unit is NOT in the state of flying. Otherwise, the location information of the mobile unit 105 is checked as invalid, which means that the mobile unit 105 is considered as being in the state of flying.

In step 8140, the location platform 170 sends a response message (i.e. location check response) indicating "valid" or "invalid" to the base unit 110.

If the base unit 110 receives the response message indicating "valid", which means that the mobile unit 105 is not in the state of flying, the base unit considers the mobile unit 105 as a normal mobile unit and continues serving the mobile unit 105. If the base unit 110 receives the response message indicating "invalid", which means that the mobile unit 105 is in the state of flying, the method proceeds to step 8150.

In the step 8150, the base unit 110 sends a "Detach request or indication of session/bearer release" message to MME, to request the MME to stop serving the mobile unit 105 that is in the state of flying but is an unregistered aerial vehicle. According to some embodiments, the message may include a cause value to indicate the reason why the MME should stop serving the mobile unit 105. The reason may be that the mobile unit 105 is in the state of flying but is an unregistered aerial vehicle.

In step 8160, upon receiving the "Detach request or indication of session/bearer release" message from the base unit 110, the MME initiates "Detach procedure" message or "Delete session/bearer request" message, to stop serving the mobile unit 105. According to some embodiments, the message may include a cause value to indicate the reason why the MME should stop serving the mobile unit 105. The reason may be that the mobile unit 105 is in the state of flying but is an unregistered aerial vehicle.

Incidentally, the "Detach request or indication of session/bearer release" and the "Detach procedure" or "Delete session/bearer request" are in the context of EPS architecture. In a 5G network, the "Detach request or indication of session/bearer release" is changed to "Deregistration request or PDU session release request"; while the "Detach procedure" or "Delete session/bearer request" is changed to "AMF initiated deregistration and PDU session release request".

FIG. 8-2 illustrates a schematic flow chart diagram of the first embodiment of misused aerial usage identification.

Step 8210 is the same as the step 8110.
Step 8220 is the same as the step 8120.
If the judgment of the step 8220 is Yes (i.e. the base unit 110 has received the air-borne assistance information (ABI)

240 of the mobile unit 105), the base unit 110 continues serving the mobile unit 105 as a registered aerial vehicle, in step 8230.

If the judgment of the step 8220 is No (i.e. the base unit 110 has NOT received the air-borne assistance information (ABI) 240 of the mobile unit 105), the base unit 110 checks whether the mobile unit 105 is in the state of flying by communicating with the location platform 170, in step 8240. The step 8240 corresponds to steps 8130 and 8140.

If the judgment of the step 8240 is Yes (i.e. the mobile unit 105 is in the state of flying), the base unit 110 takes further actions to stop serving the mobile unit 105, in step 8250. The step 8250 corresponds to the steps 8150 and 8160.

If the judgment of the step 8240 is No (i.e. the mobile unit 105 is NOT in the state of flying), the base unit 110 continues serving the mobile unit 105 as a normal mobile unit, in step 8260.

Figures 1, 9:
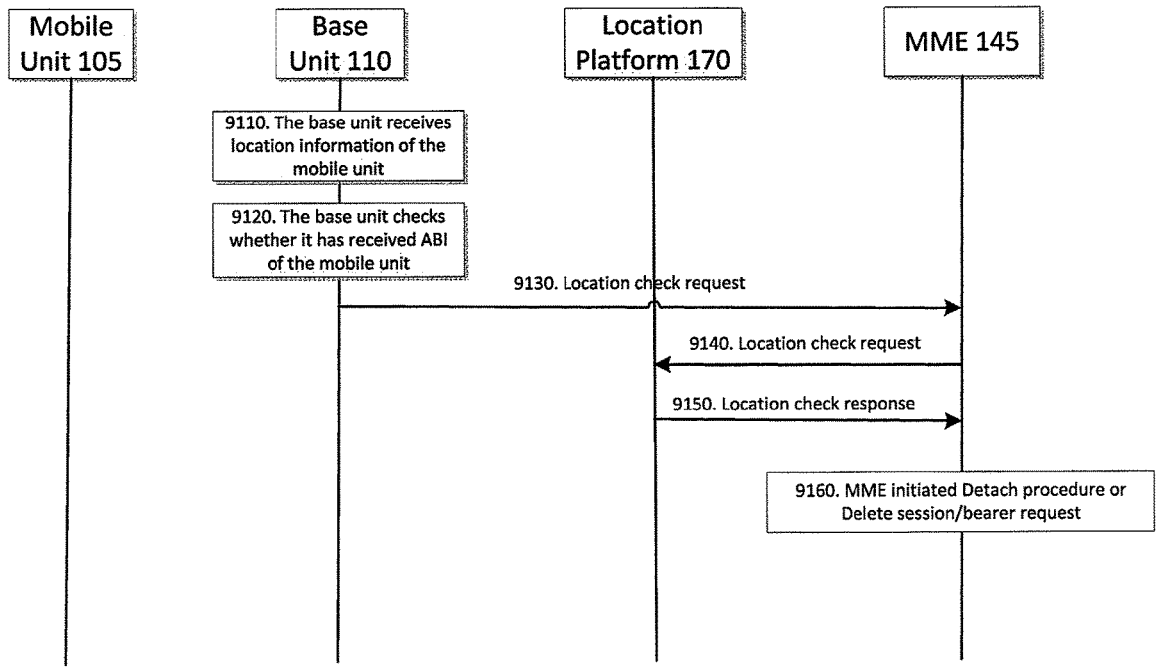
Figures 2, 9:
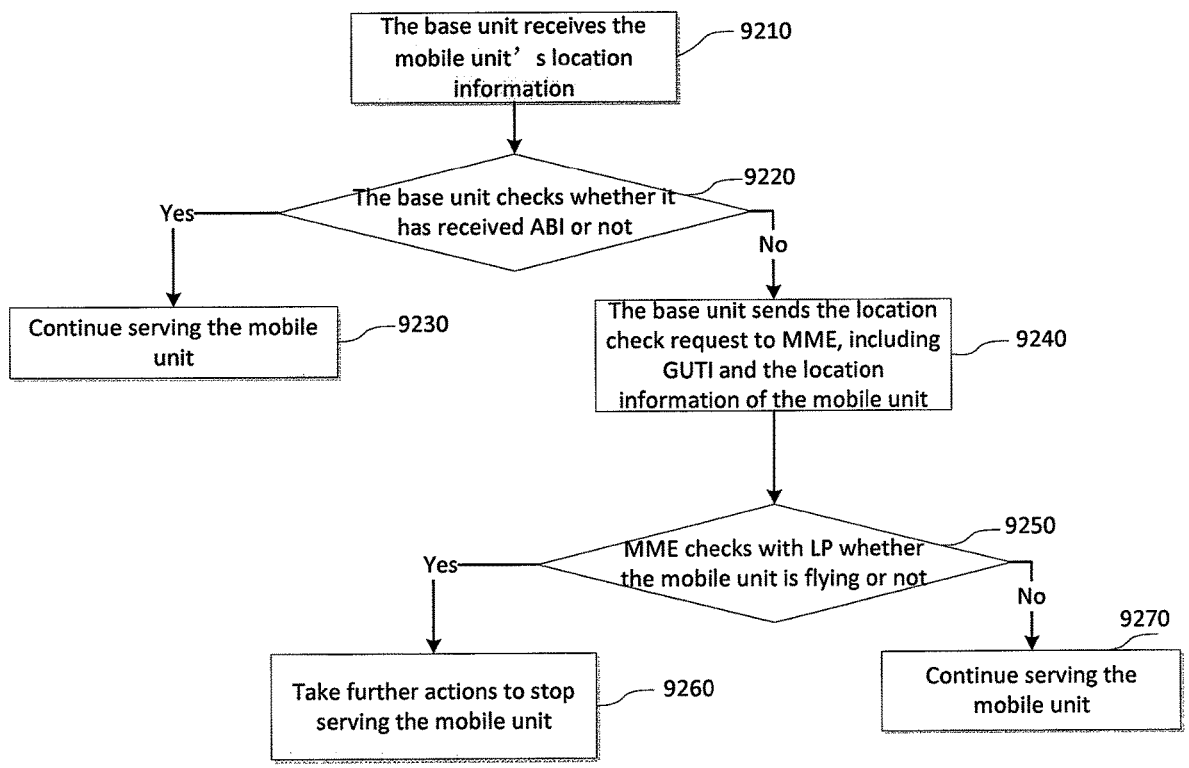

FIG. 9-1 illustrates a second embodiment of misused aerial usage identification. In the second embodiment, it is assumed that the MME complies with its behavior 1 and the location platform 170 is deployed as illustrated in FIG. 7-2. That is, in the second embodiment, the MME 145 sends the ABI 240 to the base unit 110 no matter whether or not the ABI 240 is empty. In addition, the location platform 170 is connected to the MME 145.

In step 9110, the base unit 110 receives location information of the mobile unit 105. Preferably, the location information of the mobile unit 105 is comprised of three dimensional coordinates of the place where the mobile unit 105 resides.

In step 9120, the base unit 110 checks whether it has received air-borne assistance information (ABI) 240 of the mobile unit 105. If the base unit 110 has received the air-borne assistance information (ABI) 240 of the mobile unit 105, the base unit 110 continues serving the mobile unit 105 that is a registered aerial vehicle. The steps 9130-9160 will not be performed in the condition that the mobile unit 105 is the registered aerial vehicle.

On the other hand, if the base unit 110 has not received the ABI 240 of the mobile unit 105, the base unit 110 considers that the mobile unit 105 is an unregistered aerial vehicle. In this condition, the method proceeds to step 9130.

In the step 9130, the base unit 110 sends a location check request to the MME 145. The location check request includes a UE temp identity (GUTI) of the mobile unit 105 and location information of the mobile unit 105.

In step 9140, in response to the receipt of the location check request from the base unit 110, the MME 145 sends a location check request to the location platform 170. The location check request includes the location information of the mobile unit 105.

In step 9150, similar to the step 8140, the location platform 170 checks whether the mobile unit 105 is in the state of flying according to the comparison between the three dimensional information of the area where the mobile unit 105 resides and the location information of the mobile unit 105, and sends a response message (i.e. location check response) indicating "valid" or "invalid" to the MME 145, in which "valid" means that it has high possibility that the mobile unit 105 is not in the state of flying, while "invalid" means that the mobile unit 105 is considered as being in the state of flying.

If the MME 145 receives the response message indicating "valid", the MME 145 considers that the mobile unit 105 is not in the state of flying and continues serving the mobile unit 105 as a normal mobile unit. If the MME 145 receives the response message indicating "invalid", which means that the mobile unit 105 is in the state of flying, the method proceeds to step 9160.

In the step 9160, the MME initiates "Detach procedure" or "Delete session/bearer request", to stop serving the mobile unit 105. According to some embodiments, the request may include a cause value to indicate the reason why the MME stops serving the mobile unit 105. The reason may be that the mobile unit 105 is in the state of flying but is an unregistered aerial vehicle.

FIG. 9-2 illustrates a schematic flow chart diagram of the second embodiment of misused aerial usage identification.

Step 9210 is the same as the step 9110.

Step 9220 is the same as the step 9120.

If the judgment of the step 9220 is Yes (i.e. the base unit 110 has received the air-borne assistance information (ABI) 240 of the mobile unit 105), the base unit 110 continues serving the mobile unit 105 as a registered aerial vehicle, in step 9230.

If the judgment of the step 9220 is No (i.e. the base unit 110 has NOT received the air-borne assistance information (ABI) 240 of the mobile unit 105), the base unit 110 sends a location check request to the MME 145, in step 9240. The location check request includes a UE temp identity (GUTI) of the mobile unit 105 and location information of the mobile unit 105.

In step 9250, the MME checks whether the mobile unit 105 is in the state of flying by communicating with the location platform 170. The step 9250 corresponds to the steps 9140 and 9150.

If the judgment of step 9250 is Yes (i.e. the mobile unit 105 is in the state of flying), the MME 145 takes further actions to stop serving the mobile unit 105, in step 9260. In particular, the MME 145 initiates Detach procedure or Delete session/bearer request.

If the judgment of step 9250 is No (i.e. the mobile unit 105 is NOT in the state of flying), the MME 145 continues serving the mobile unit 105 as a normal mobile unit, in step 9270.

Figures 1, 10:
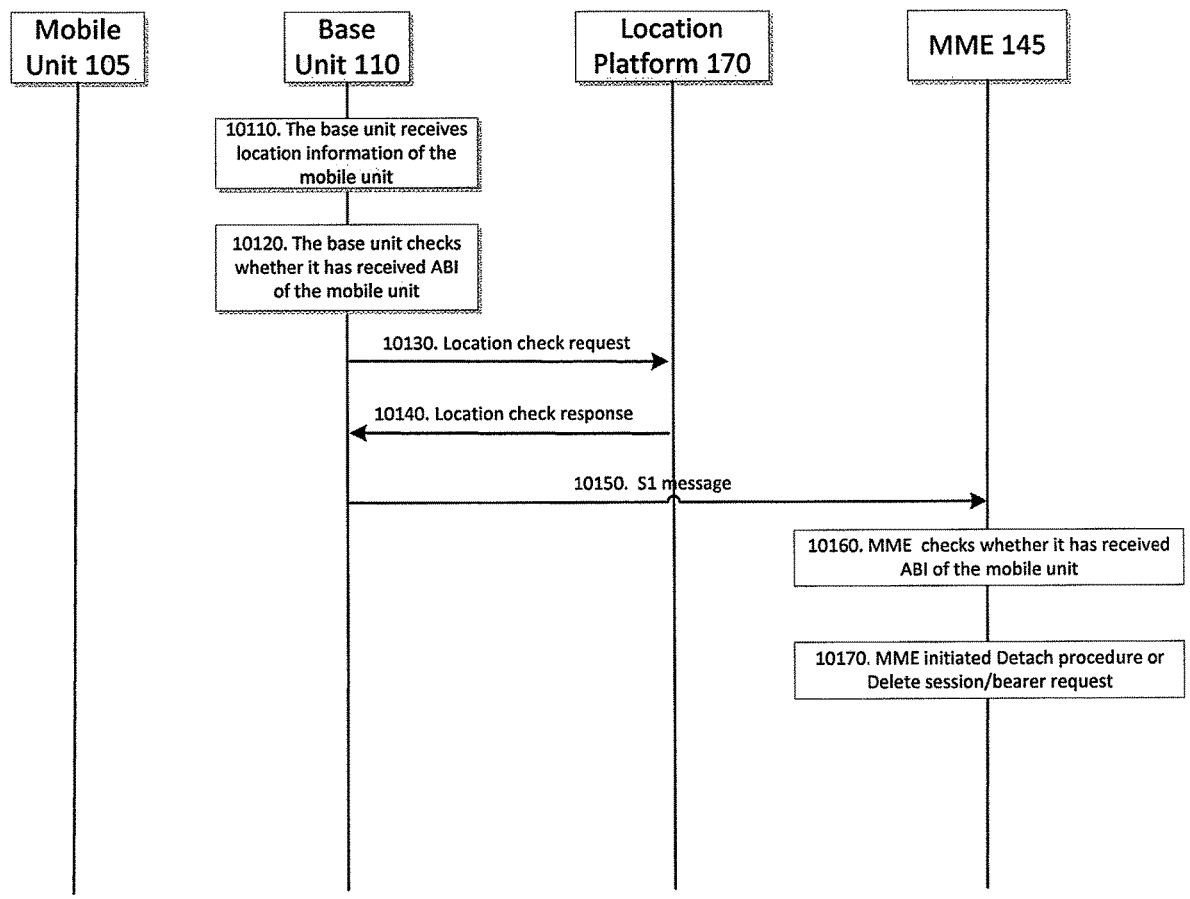
Figures 2, 10:
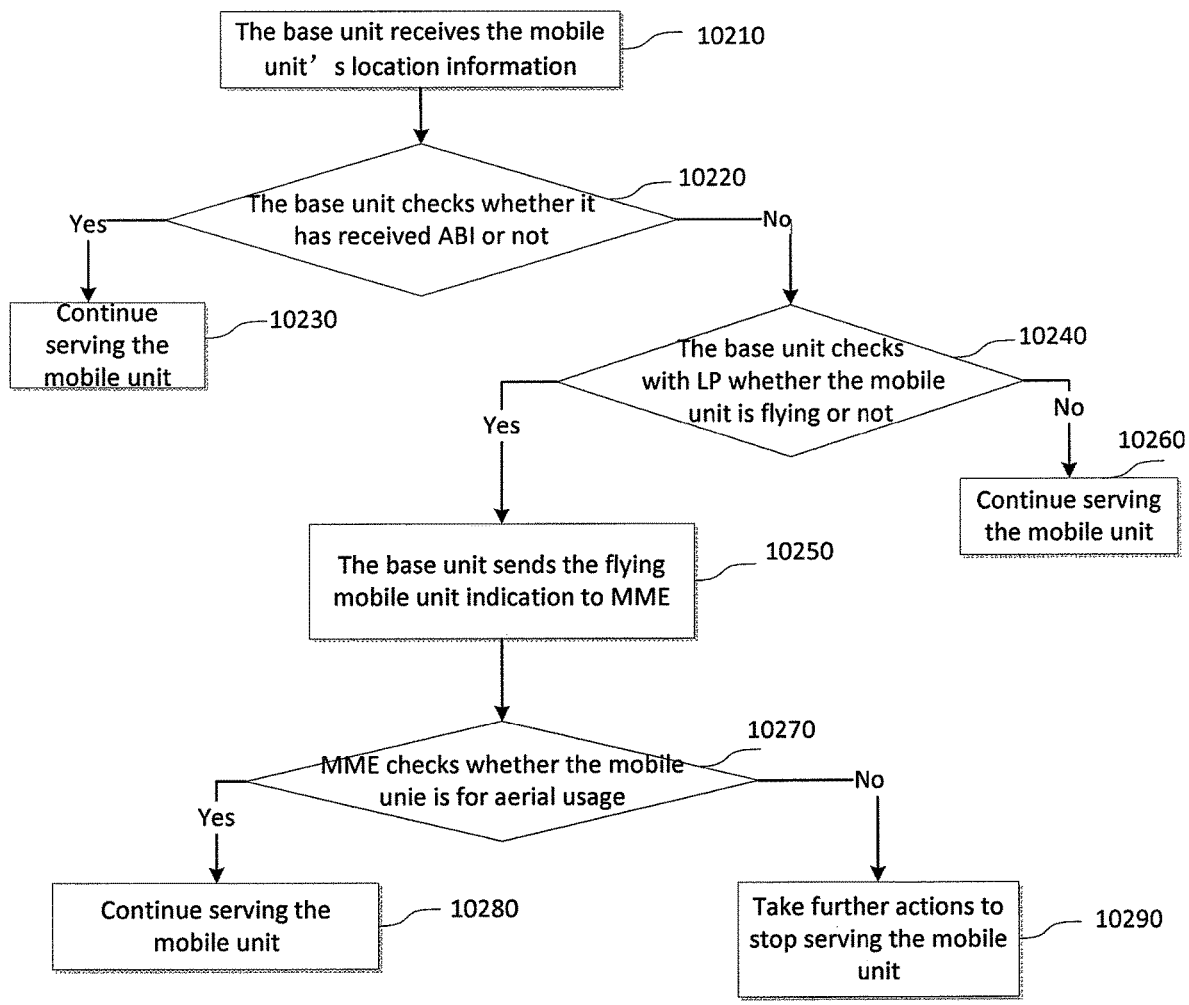

FIG. 10-1 illustrates a third embodiment of misused aerial usage identification. In the third embodiment, it is assumed that the MME complies with its behavior 2 and the location platform is deployed as illustrated in FIG. 7-1. That is, in the third embodiment, the MME 145 first checks whether or not the ABI 240 is empty. Only in the condition that the ABI 240 is not empty, the MME 145 sends the non-empty ABI 240 to the base unit 110. In addition, the location platform 170 is connected directly to the base unit 110.

In step 10110, the base unit 110 receives location information of the mobile unit 105. Preferably, the location information of the mobile unit 105 is comprised of three dimensional coordinates of the place where the mobile unit 105 resides.

In step 10120, the base unit 110 checks whether it has received air-borne assistance information (ABI) 240 of the mobile unit 105. If the base unit 110 has received the air-borne assistance information (ABI) 240 of the mobile unit 105, the base unit 110 continues serving the mobile unit 105 that is a registered aerial vehicle. The steps 10130-10170 will not be performed in the condition that the mobile unit 105 is the registered aerial vehicle.

On the other hand, if the base unit 110 has not received the ABI 240 of the mobile unit 105, the base unit 110 cannot judge whether the mobile unit 105 is an unregistered aerial vehicle or not. In this condition, the method proceeds to step 10130.

In the step 10130, the base unit 110 sends a location check request to the location platform 170. The location check request includes the location information of the mobile unit 105, which is preferably the three dimensional coordinates of the mobile unit 105.

In step 10140, similar to the step 8140, the location platform checks whether the mobile unit 105 is in the state of flying according to the comparison between the three dimensional information of the area where the mobile unit 105 resides and the location information of the mobile unit 105, and sends a response message (i.e. location check response) indicating "valid" or "invalid" to the base unit 110, in which "valid" means that it has high possibility that the mobile unit 105 is not in the state of flying, while "invalid" means that the mobile unit 105 is considered as being in the state of flying.

If the base unit 110 receives the response message indicating "valid", which means that the mobile unit 105 is not in the state of flying, the base unit 110 considers the mobile unit 105 as a normal mobile unit and continues serving the mobile unit 105 as the normal mobile unit. If the base unit 110 receives the response message indicating "invalid", which means that the mobile unit 105 is in the state of flying, the method proceeds to step 10150.

As described above, in the behavior 2 of the MME, the base unit 110 only receives the air-borne assistance information (ABI) 240 of registered aerial vehicles that are not empty. Therefore, when the base unit 110 does not receive the air-borne assistance information (ABI) 240 of a particular mobile unit, it does not know whether the particular mobile unit is an unregistered aerial vehicle, or the particular mobile unit is a registered aerial vehicle that has an empty air-borne assistance information (ABI) 240.

In the step 10150, the base unit 110 sends a S1 message to the MME 145. The S1 message includes a UE temp identity (GUTI) of the mobile unit 105 and an indicator indicating that the mobile unit 105 is in the state of flying.

In step 10160, in response to receiving the S1 message, the MME 145 checks whether it has received the air-borne assistance information (ABI) 240 of the mobile unit 105. If the MME 145 has received the air-borne assistance information (ABI) 240 of the mobile unit 105, the MME 145 continues serving the mobile unit 105 that is a registered aerial vehicle. In the condition that the mobile unit 105 is the registered aerial vehicle, step 10170 is NOT performed.

On the other hand, if the MME 145 has not received the ABI 240 of the mobile unit 105, the MME 145 considers that the mobile unit 105 is an unregistered aerial vehicle. The method proceeds to the step 10170.

In the step 10170, the MME initiates "Detach procedure" or "Delete session/bearer request", to stop serving the mobile unit 105. According to some embodiments, the request may include a cause value to indicate the reason why the MME stops serving the mobile unit 105. The reason may be that the mobile unit 105 is in the state of flying but is an unregistered aerial vehicle.

FIG. 10-2 illustrates a schematic flow chart diagram of the third embodiment of misused aerial usage identification.

Step 10210 is the same as the step 10110.

Step 10220 is the same as the step 10120.

If the judgment of the step 10220 is Yes (i.e. the base unit 110 has received the air-borne assistance information (ABI) 240 of the mobile unit 105), the base unit 110 continues serving the mobile unit 105 as a registered aerial vehicle, in step 10230.

If the judgment of the step 10220 is No (i.e. the base unit 110 has NOT received the air-borne assistance information (ABI) 240 of the mobile unit 105), the base unit 110 checks whether the mobile unit 105 is in the state of flying by communicating with the location platform 170, in step 10240. The step 10240 corresponds to steps 10130 and 10140.

If the judgment of the step 10240 is Yes (i.e. the mobile unit 105 is in the state of flying), the base unit 110 sends a S1 message to the MME 145, in step 10250. The S1 message includes a UE temp identity (GUTI) of the mobile unit 105 and an indicator indicating that the mobile unit 105 is in the state of flying.

If the judgment of the step 10240 is No (i.e. the mobile unit 105 is NOT in the state of flying), the base unit 110 continues serving the mobile unit 105 as a normal mobile unit, in step 10260.

In step 10270, in response to receiving the S1 message, the MME 145 checks whether it has received the air-borne assistance information (ABI) 240 of the mobile unit 105.

If the judgment of the step 10270 is Yes (i.e. the MME 145 has received the air-borne assistance information (ABI) 240 of the mobile unit 105), the MME 145 continues serving the mobile unit 105 as a registered aerial vehicle, in step 10280.

If the judgment of the step 10270 is No (i.e. the MME 145 has not received the air-borne assistance information (ABI) 240 of the mobile unit 105), the MME takes further actions to stop serving the mobile unit 105, in step 10290. In particular, the MME 145 initiates "Detach procedure" or "Delete session/bearer request".

Figures 1, 11:
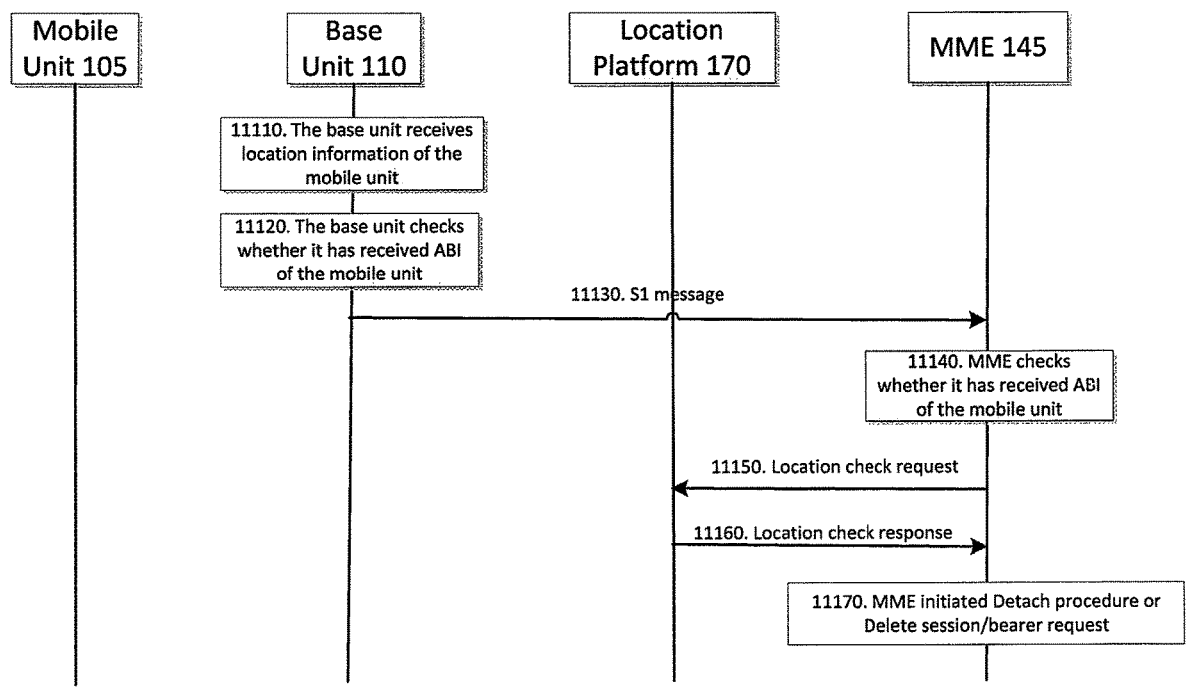
Figures 2, 11:
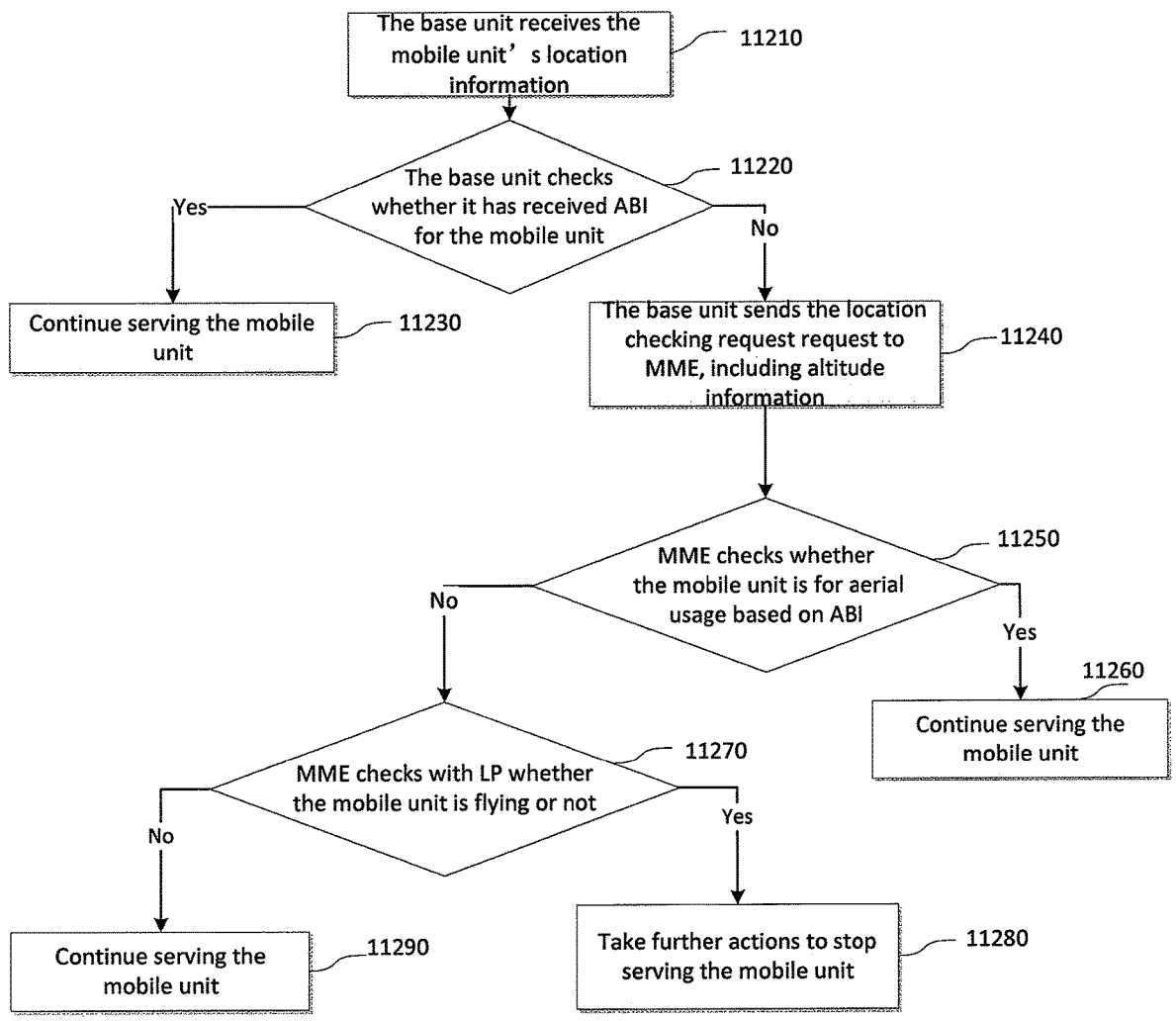

FIG. 11-1 illustrates a fourth embodiment of misused aerial usage identification. In the fourth embodiment, it is assumed that the MME complies with its behavior 2 and the location platform is deployed as illustrated in FIG. 7-2. That is, in the fourth embodiment, the MME 145 first checks whether or not the ABI 240 is empty. Only in the condition that the ABI 240 is not empty, the MME 145 sends the ABI 240 to the base unit 110. In addition, the location platform 170 is connected to the MME 145.

In step 11110, the base unit 110 receives location information of the mobile unit 105. Preferably, the location information of the mobile unit 105 is comprised of three dimensional coordinates of the place where the mobile unit 105 resides.

In step 11120, the base unit 110 checks whether it has received air-borne assistance information (ABI) 240 of the mobile unit 105. If the base unit 110 has received the air-borne assistance information (ABI) 240 of the mobile unit 105, the base unit 110 continues serving the mobile unit 105 that is a registered aerial vehicle. The steps 11130-11170 will not be performed in the condition that the mobile unit 105 is the registered aerial vehicle.

On the other hand, if the base unit 110 has not received the ABI 240 of the mobile unit 105, the base unit 110 cannot judge whether or not the mobile unit 105 is an unregistered aerial vehicle. In this condition, the method proceeds to step 11130.

In the step 11130, the base unit 110 sends an S1 message to the MME 145. The S1 message includes a UE temp identity (GUTI) of the mobile unit 105 and location information of the mobile unit 105. Preferably, the location information of the mobile unit 105 is comprised of three dimensional coordinates of the place where the mobile unit 105 resides.

In step 11140, in response to receiving the S1 message, the MME 145 checks whether it has received the air-borne assistance information (ABI) 240 of the mobile unit 105. If the MME 145 has received the air-borne assistance information (ABI) 240 of the mobile unit 105, the MME 145 continues serving the mobile unit 105 that is a registered aerial vehicle. In the condition that the mobile unit 105 is the registered aerial vehicle, steps 11150-11170 are NOT performed.

On the other hand, if the MME 145 has not received the ABI 240 of the mobile unit 105, the MME 145 considers that the mobile unit 105 is an unregistered aerial vehicle. The method proceeds to step 11150.

In the step 11150, the MME sends a location check request to the location platform 170. The location check request includes the location information of the mobile unit 105, which is preferably the three dimensional coordinates of the mobile unit 105.

In the step 11160, similar to the step 9150, the location platform 170 checks whether the mobile unit 105 is in the state of flying according to the comparison between the three dimensional information of the area where the mobile unit 105 resides and the location information of the mobile unit 105, and sends a response message (i.e. location check response) indicating "valid" or "invalid" to the MME 145, in which "valid" means that there is a high possibility that the mobile unit 105 is not in the state of flying, while "invalid" means that the mobile unit 105 is considered as being in the state of flying.

If the MME 145 receives the response message indicating "valid", the MME considers that the mobile unit 105 is not in the state of flying and continues serving the mobile unit 105 as a normal mobile unit. If the MME 145 receives the response message indicating "invalid", which means that the mobile unit 105 is in the state of flying, the method proceeds to step 11170.

In the step 11170, the MME initiates "Detach procedure" or "Delete session/bearer request", to stop serving the mobile unit 105. According to some embodiments, the request may include a cause value to indicate the reason why the MME stops serving the mobile unit 105. The reason may be that the mobile unit 105 is in the state of flying but is an unregistered aerial vehicle.

FIG. 11-2 illustrates a schematic flow chart diagram of the fourth embodiment of misused aerial usage identification.

Step 11210 is the same as the step 11110.

Step 11220 is the same as the step 11120.

If the judgment of the step 11220 is Yes (i.e. the base unit 110 has received the air-borne assistance information (ABI) 240 of the mobile unit 105), the base unit 110 continues serving the mobile unit 105 as a registered aerial vehicle, in step 11230.

If the judgment of the step 11220 is No (i.e. the base unit 110 has NOT received the air-borne assistance information (ABI) 240 of the mobile unit 105), the base unit 110 sends a S1 message to the MME 145, in step 11240. Similar to the step 11130, the S1 message includes the UE temp identity (GUTI) of the mobile unit 105 and the location information of the mobile unit 105. Preferably, the location information of the mobile unit 105 comprises three dimensional coordinates of the place where the mobile unit 105 resides.

In step 11250, the MME 145 checks whether the mobile unit 105 is in the state of flying by communicating with the location platform 170.

If the judgment of the step 11250 is Yes (i.e. the MME 145 has received the air-borne assistance information (ABI) 240 of the mobile unit 105), the MME 145 continues serving the mobile unit 105 as a registered aerial vehicle, in step 11260.

If the judgment of the step 11250 is No (i.e. the MME 145 has not received the air-borne assistance information (ABI) 240 of the mobile unit 105), the MME 145 checks whether the mobile unit 105 is in the state of flying by communicating with the location platform 170, in step 11270. The step 11270 corresponds to the steps 11150 and 11160.

If the judgment of the step 11270 is Yes (i.e. the mobile unit 105 is in the state of flying), the MME 145 takes further actions to stop serving the mobile unit 105, in step 11280. In particular, the MME 145 initiates the Detach procedure or the Delete session/bearer request.

If the judgment of the step 11270 is No (i.e. the mobile unit 105 is NOT in the state of flying), the MME 145 continues serving the mobile unit 105 as a normal mobile unit, in step 11290.

Figure 12:
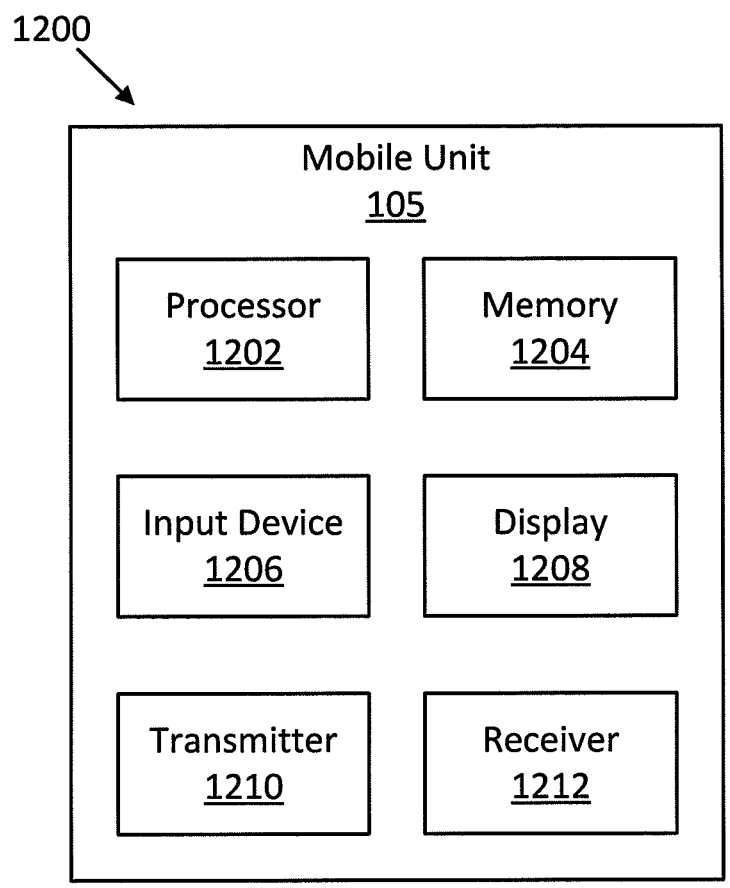
FIG. 12 is a schematic block diagram illustrating one embodiment of an apparatus that may be used in performing misused aerial usage identification.

FIG. 12 depicts one embodiment of an apparatus 1200 that may be used in performing misused aerial usage identification. The apparatus 1200 includes one embodiment of the mobile unit 105. Furthermore, the mobile unit 105 may include a processor 1202, a memory 1204, an input device 1206, a display 1208, a transmitter 1210, and a receiver 1212. In some embodiments, the input device 1206 and the display 1208 are combined into a single device, such as a touch screen. In certain embodiments, the mobile unit 105 may not include any input device 1206 and/or display 1208. In various embodiments, the mobile unit 105 may include one or more of the processor 1202, the memory 1204, the transmitter 1210, and the receiver 1212, and may not include the input device 1206 and/or the display 1208.

The processor 1202, in one embodiment, may include any known controller capable of executing computer-readable instructions and/or capable of performing logical operations. For example, the processor 1202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1202 executes instructions stored in the memory 1204 to perform the methods and routines described herein.

The memory 1204, in one embodiment, is a computer-readable storage medium. In some embodiments, the memory 1204 includes volatile computer storage media. For example, the memory 1204 may include RAM, including dynamic RAM ("DRAM"), synchronous dynamic RAM ("SDRAM"), and/or static RAM ("SRAM"). In some embodiments, the memory 1204 includes non-volatile computer storage media. For example, the memory 1204 may include a hard disk drive, a flash memory, or any other suitable non-volatile computer storage device. In some embodiments, the memory 1204 includes both volatile and non-volatile computer storage media. In some embodiments, the memory 1204 also stores program code and related data, such as an operating system or other controller algorithms operating on the mobile unit 105.

The input device 1206, in one embodiment, may include any known computer input device including a touch panel, a button, a keyboard, a stylus, a microphone, or the like. In some embodiments, the input device 1206 may be integrated with the display 1208, for example, as a touch screen or similar touch-sensitive display. In some embodiments, the input device 1206 includes a touch screen such that text may be input using a virtual keyboard displayed on the touch screen and/or by handwriting on the touch screen. In some embodiments, the input device 1206 includes two or more different devices, such as a keyboard and a touch panel.

The display 1208, in one embodiment, may include any known electronically controllable display or display device. The display 1208 may be designed to output visual, audible, and/or haptic signals. In some embodiments, the display 1208 includes an electronic display capable of outputting visual data to a user. For example, the display 1208 may include, but is not limited to, an LCD display, an LED display, an OLED display, a projector, or similar display device capable of outputting images, text, or the like to a user. As another, non-limiting example, the display 1208 may include a wearable display such as a smart watch, smart glasses, a heads-up display, or the like. Further, the display 1208 may be a component of a smart phone, a personal digital assistant, a television, a table computer, a notebook (laptop) computer, a personal computer, a vehicle dashboard, or the like.

In certain embodiments, the display 1208 includes one or more speakers for producing sound. For example, the display 1208 may produce an audible alert or notification (e.g., a beep or chime). In some embodiments, the display 1208 includes one or more haptic devices for producing vibrations, motion, or other haptic feedback. In some embodiments, all or portions of the display 1208 may be integrated with the input device 1206. For example, the input device 1206 and display 1208 may form a touch screen or similar touch-sensitive display. In other embodiments, the display 1208 may be located near the input device 1206.

The transmitter 1210 is used to provide UL communication signals to the base unit 110 and the receiver 1212 is used to receive DL communication signals from the base unit 110. Although only one transmitter 1210 and one receiver 1212 are illustrated, the mobile unit 105 may have any suitable number of transmitters 410 and receivers 412. The transmitter 1210 and the receiver 1212 may be any suitable type of transmitter and receiver. In one embodiment, the transmitter 1210 and the receiver 1212 may be part of a transceiver.

Figure 13:
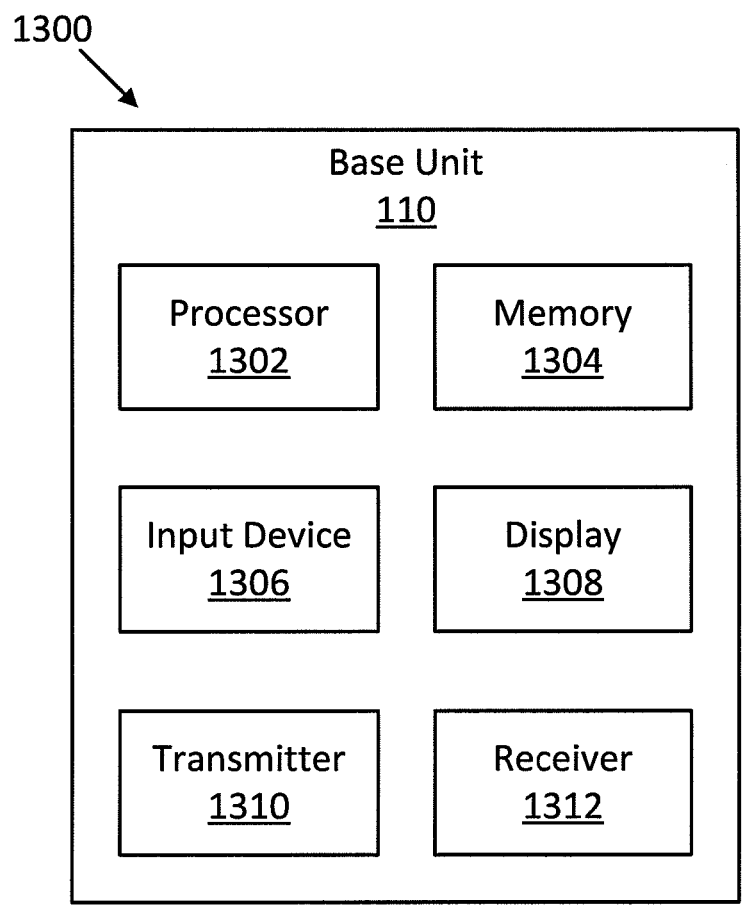
FIG. 13 is a schematic block diagram illustrating one embodiment of an apparatus that may be used for performing misused aerial usage identification.

FIG. 13 depicts one embodiment of an apparatus 1300 that may be used for performing misused aerial usage identification. The apparatus 1300 includes one embodiment of the base unit 110. Furthermore, the base unit 110 may include a processor 1302, a memory 1304, an input device 1306, a display 1308, a transmitter 1310, and a receiver 1312. As may be appreciated, the processor 1302, the memory 1304, the input device 1306, the display 1308, the transmitter 1310, and the receiver 1312 may be substantially similar to the processor 1202, the memory 1204, the input device 1206, the display 1208, the transmitter 1210, and the receiver 1212 of the mobile unit 105, respectively.

In some embodiments, the receiver 1312 may be used to receive location information of the mobile unit 105 from the transmitter 1210 of the mobile unit 105. Although only one transmitter 1310 and one receiver 1312 are illustrated, the base unit 110 may have any suitable number of transmitters 1310 and receivers 1312. The transmitter 1310 and the receiver 1312 may be any suitable type of transmitter and receiver. In one embodiment, the transmitter 1310 and the receiver 1312 may be part of a transceiver.

Figure 14:
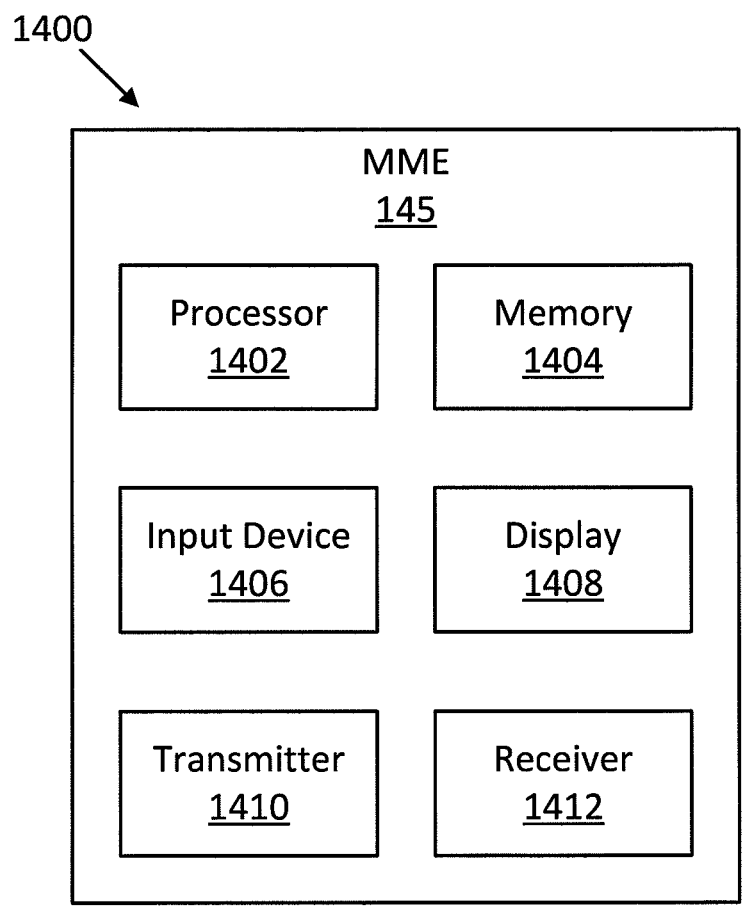
FIG. 14 is a schematic block diagram illustrating one embodiment of a control node that may be used for performing misused aerial usage identification.

FIG. 14 depicts one embodiment of a control node 1400 that may be used for performing misused aerial usage identification. The control node 1400 includes one embodiment of the MME 145. Furthermore, the MME 145 may include a processor 1402, a memory 1404, an input device 1406, a display 1408, a transmitter 1410, and a receiver 1412. As may be appreciated, the processor 1402, the memory 1404, the input device 1406, the display 1408, the transmitter 1410, and the receiver 1412 may be substantially similar to the processor 1302, the memory 1304, the input device 1306, the display 1308, the transmitter 1310, and the receiver 1312 of the base unit 110, respectively.

In some embodiments, the receiver 1412 may be used to receive message(s) from the transmitter 1310 of the base unit 110. Although only one transmitter 1410 and one receiver 1412 are illustrated, the MME 145 may have any suitable number of transmitters 1410 and receivers 1412. The transmitter 1410 and the receiver 1412 may be any suitable type of transmitters and receivers. In one embodiment, the transmitter 1410 and the receiver 1412 may be part of a transceiver.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method in a base unit, the method comprising:
   receiving location information of a mobile unit;
   judging whether the mobile unit is a registered aerial vehicle or an unregistered aerial vehicle, wherein:
   the mobile unit is judged to be a registered aerial vehicle in response to the base unit having stored information indicating that an air-borne assistance information message, without regard to the content of the air-borne assistance information message, is received prior to receiving the location information; and
   the mobile unit is judged to be an unregistered aerial vehicle in response to the base unit not having stored information indicating that the air-borne assistance information message is received prior to receiving the location information;
   determining whether the mobile unit is in the state of flying based on the location information of the mobile unit; and
   identifying the mobile unit as a misused aerial vehicle in the condition that the mobile unit is determined as in the state of flying and is judged as the unregistered aerial vehicle.

2. The method of claim 1, wherein, in the condition that the mobile unit is judged as the unregistered aerial vehicle, the determining whether the mobile unit is in the state of flying is performed.

3. The method of claim 1, wherein a control node sends the air-borne assistance information to the base unit.

4. The method of claim 3, wherein the control node sends the air-borne assistance information to the base unit no matter whether the air-borne assistance information is empty.

5. The method of claim 1, wherein the air-borne assistance information comprises an expected altitude range, a mobility pattern, path information, an altitude restriction, a speed restriction, or some combination thereof.

6. The method of claim 1, wherein the base unit sends the location information of the mobile unit to a location platform to determine whether the mobile unit is in the state of flying.

7. The method of claim 1, wherein, in the condition that the mobile unit cannot be judged as the registered aerial vehicle, the determining whether the mobile unit is in the state of flying is performed.

8. A base unit comprising:
a transceiver that receives location information of a mobile unit;
a memory; and
a processor that:
  judges whether the mobile unit is a registered aerial vehicle or an unregistered aerial vehicle, wherein:
    the mobile unit is judged to be a registered aerial vehicle in response to the base unit having stored information in the memory indicating that an air-borne assistance information message, without regard to the content of the air-borne assistance information message, is received prior to receiving the location information; and
    the mobile unit is judged to be an unregistered aerial vehicle in response to the base unit not having stored information in the memory indicating that the air-borne assistance information message is received prior to receiving the location information;
  determines whether the mobile unit is in the state of flying based on the location information of the mobile unit; and
  identifies the mobile unit as a misused aerial vehicle in the condition that the mobile unit is determined as in the state of flying and is judged as the unregistered aerial vehicle.

9. The base unit of claim 8, wherein, the processor, in response to identifying the mobile unit as the misused aerial vehicle, requests a control node to stop serving the mobile unit.

10. The base unit of claim 8, wherein the processor, in the condition that the mobile unit is judged as the unregistered aerial vehicle, determines whether the mobile unit is in the state of flying.

11. The base unit of claim 8, wherein the transceiver receives the air-borne assistance information from a control node.

12. The base unit of claim 8, wherein the processor instructs the transceiver to send the location information of the mobile unit to a location platform to determine whether the mobile unit is in the state of flying.

13. The base unit of claim 8, wherein the processor, in the condition that the mobile unit cannot be judged as the registered aerial vehicle, determines whether the mobile unit is in the state of flying.

14. A control node comprising:
a transceiver that receives from a base unit a request for stopping serving a mobile unit; and
a processor that stops serving the mobile unit upon receiving the request, wherein the transceiver transmits air-borne assistance information to the base unit even if the air-borne assistance information is empty.

15. The control node of claim 14, wherein, the processor judges whether the mobile unit is an unregistered aerial vehicle, and stops serving the mobile unit in the condition that the mobile unit is judged as the unregistered aerial vehicle.

16. The control node of claim 14, wherein the processor instructs the transceiver to transmit location information of the mobile unit to a location platform to determine whether the mobile unit is in the state of flying, and stops serving the mobile unit in the condition that the mobile unit is determined as in the state of flying.

17. The control node of claim 14, wherein the transceiver transmits the air-borne assistance information to the base unit.

* * * * *